(12) United States Patent
Nocon et al.

(10) Patent No.: US 12,299,204 B2
(45) Date of Patent: May 13, 2025

(54) MANAGING STATES OF A GESTURE RECOGNITION DEVICE AND AN INTERACTIVE CASING

(71) Applicant: Warner Bros. Entertainment Inc., Burbank, CA (US)

(72) Inventors: Nathan Nocon, Valencia, CA (US); Michael Goslin, Sherman Oaks, CA (US); Jonathan Hsu, Yorba Linda, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 771 days.

(21) Appl. No.: 17/547,443

(22) Filed: Dec. 10, 2021

(65) Prior Publication Data

US 2022/0100281 A1 Mar. 31, 2022

Related U.S. Application Data

(63) Continuation-in-part of application No. PCT/US2020/049372, filed on Sep. 4, 2020.
(Continued)

(51) Int. Cl.
*A63H 33/26* (2006.01)
*A63F 9/24* (2006.01)
(Continued)

(52) U.S. Cl.
CPC ............... *G06F 3/017* (2013.01); *A63F 9/24* (2013.01); *A63H 33/22* (2013.01); *A63H 33/26* (2013.01);
(Continued)

(58) Field of Classification Search
CPC ........... G06F 3/017; G06V 40/28; A63F 9/24; A63H 33/26
See application file for complete search history.

(56) References Cited

U.S. PATENT DOCUMENTS 9,497,819 B2 11/2016 Van et al.
10,222,868 B2 3/2019 Martinez Fernandez et al.
(Continued)

FOREIGN PATENT DOCUMENTS

EP 3007030 A1 4/2016
KR 10-2017-0035547 A 3/2017
(Continued)

OTHER PUBLICATIONS

Shuo Jiang et al., Development of a real-time hand gesture recognition wristband based on sEMG and IMU sensing, Dec. 1, 2016, IEEE International Conference on Robotics and Biomimetics, pp. 1-6 (Year: 2016).*
(Continued)

*Primary Examiner* — Tam T Tran
(74) *Attorney, Agent, or Firm* — Alston & Bird LLP

(57) ABSTRACT

Provided is a system that includes an interactive casing and a GR device. The interactive casing receives a first signal based on activation of a masked electrical switch by release of a magnetic assertion when a lid member of an interactive casing is disengaged from a base member of the interactive casing. A first system state of the interactive casing is converted to a second system state. Audio-visual feedback is generated and a second signal is communicated to the GR device based on the conversion. Based on the received second signal, a first device state of the GR device is converted to a second device state. Power levels of a first power storage device of the interactive casing and a second power storage device of the GR device are maintained during the first system state and the first device state, respectively.

20 Claims, 15 Drawing Sheets

Related U.S. Application Data

(60) Provisional application No. 62/897,220, filed on Sep. 6, 2019.

(51) Int. Cl.
*A63H 33/22* (2006.01)
*G06F 3/01* (2006.01)
*G06F 3/03* (2006.01)
*G06F 3/0346* (2013.01)
*G06V 40/10* (2022.01)
*G06V 40/20* (2022.01)
*H05B 45/20* (2020.01)
*H05B 47/13* (2020.01)
*H05B 47/195* (2020.01)

(52) U.S. Cl.
CPC .......... *G06F 3/0304* (2013.01); *G06F 3/0346* (2013.01); *G06V 40/10* (2022.01); *G06V 40/28* (2022.01); *H05B 45/20* (2020.01); *H05B 47/13* (2020.01); *H05B 47/195* (2020.01); *A63F 2009/2447* (2013.01); *A63F 2009/2454* (2013.01); *A63F 2009/247* (2013.01); *A63F 2250/485* (2013.01)

(56) References Cited

U.S. PATENT DOCUMENTS

| | | | |
|---|---|---|---|
| 10,281,987 B1 | 5/2019 | Yang et al. | |
| 11,003,307 B1 | 5/2021 | Ravasz et al. | |
| 11,021,098 B1 | 6/2021 | Brown et al. | |
| 11,086,475 B1 | 8/2021 | Ravasz et al. | |
| 11,422,669 B1 | 8/2022 | Ravasz et al. | |
| 2004/0204240 A1 | 10/2004 | Barney | |
| 2010/0134308 A1 | 6/2010 | Barnardo et al. | |
| 2011/0199292 A1 | 8/2011 | Kilbride | |
| 2013/0328762 A1 | 12/2013 | Mcculloch et al. | |
| 2013/0328763 A1 | 12/2013 | Latta et al. | |
| 2014/0092011 A1 | 4/2014 | De Foras et al. | |
| 2014/0139454 A1 | 5/2014 | Mistry et al. | |
| 2014/0240102 A1 | 8/2014 | Kawash et al. | |
| 2014/0267184 A1 | 9/2014 | Bathiche et al. | |
| 2015/0105159 A1 | 4/2015 | Palotas | |
| 2015/0185713 A1 | 7/2015 | Glickfield et al. | |
| 2015/0346834 A1 | 12/2015 | Fernandez et al. | |
| 2015/0363034 A1 | 12/2015 | Hinckley et al. | |
| 2016/0011668 A1 | 1/2016 | Gilad-Bachrach et al. | |
| 2016/0091980 A1 | 3/2016 | Baranski et al. | |
| 2017/0064169 A1 | 3/2017 | Mishra et al. | |
| 2017/0087453 A1 | 3/2017 | Poisner et al. | |
| 2017/0123515 A1 | 5/2017 | Ha et al. | |
| 2017/0308173 A1 | 10/2017 | Youn et al. | |
| 2018/0085673 A1 | 3/2018 | Birkedal | |
| 2018/0101231 A1 | 4/2018 | Seth | |
| 2019/0014048 A1 | 1/2019 | Singuru | |
| 2019/0325651 A1 | 10/2019 | Bradner et al. | |
| 2019/0369755 A1 | 12/2019 | Roper et al. | |
| 2019/0380801 A1 | 12/2019 | Savall et al. | |
| 2019/0380802 A1 | 12/2019 | Savall et al. | |
| 2020/0042111 A1 | 2/2020 | Connellan et al. | |
| 2020/0081516 A1* | 3/2020 | Zyskind | G06F 3/0346 |
| 2020/0261815 A1 | 8/2020 | Neal | |
| 2021/0025976 A1* | 1/2021 | Chandel | G06F 21/32 |
| 2021/0034188 A1* | 2/2021 | Kwon | G06F 3/03545 |
| 2021/0252386 A1 | 8/2021 | VanWyk et al. | |
| 2022/0100280 A1 | 3/2022 | Nocon et al. | |
| 2023/0113991 A1 | 4/2023 | Ang et al. | |

FOREIGN PATENT DOCUMENTS

| | | |
|---|---|---|
| WO | 2011057287 A1 | 5/2011 |
| WO | 2017/052077 A1 | 3/2017 |

OTHER PUBLICATIONS

Gregory Van Seghbroeck et al., WS-Gesture—a Gesture-based State-aware Control Framework, Dec. 1, 2010, IEEE International Conference on Service-Oriented Computing and Application, pp. 1-8 (Year: 2010).*

Combined Search and Examination Report Under Sections 17 and 18(3) for Great Britain Patent Application No. GB2305231.9, dated Oct. 5, 2023, (5 pages), Intellectual Property Office, South Wales, United Kingdom.

Communication Pursuant to Rule 164(1) EPC, Partial Supplementary European Search Report for Patent Application No. 20861529.4, dated Oct. 6, 2023, (13 pages), European Patent Office, Munich, Germany.

Notice of Allowance and Fee(s) Due for U.S. Appl. No. 17/547,395, dated Oct. 17, 2023, (9 pages), United States Patent and Trademark Office, US.

Notice of Allowance and Fees Due for U.S. Appl. No. 17/547,483, dated Oct. 12, 2023, (8 pages), United States Patent and Trademark Office, US.

Examination Report for GB Application No. 2205006.6 dated Nov. 25, 2022.

Notice of Allowance for U.S. Appl. No. 17/547,351 dated Feb. 22, 2023.

International Preliminary Report on Patentability Under Chapter I, for International Application No. PCT/US2020/049372, dated Mar. 17, 2022, (9 pages), The International Bureau of WIPO, Geneva, Switzerland.

International Search Report and Written Opinion for International Application No. PCT/US2020/049732, dated Dec. 1, 2020, (10 pages), Korean Intellectual Property Office, Daejeon, Republic of Korea.

Corrected Notice of Allowance for U.S. Appl. No. 17/547,351 dated Mar. 1, 2023.

* cited by examiner

MANAGING STATES OF A GESTURE RECOGNITION DEVICE AND AN INTERACTIVE CASING

CROSS-REFERENCE TO RELATED APPLICATION

This patent application claims priority to, and the benefit from, and is a continuation-in-part of International Application No. PCT/US20/49372, filed on Sep. 4, 2020, and which claims priority to U.S. Provisional Application No. 62/897,220, filed on Sep. 6, 2019.

Each of the above referenced patent applications is hereby incorporated herein by reference in its entirety.

FIELD

The present application relates to machine-human interfaces, and more particularly to apparatus, systems and methods for enabling gesture-centric control input for computer processes, and related applications. Further, certain embodiments of the disclosure relate to managing states of a gesture recognition device and an interactive casing.

BACKGROUND

Various user interface devices have been developed for interacting with machines, especially computers, by detecting movement of a body part or hand-held device.

A first type uses sensors to detect body movement using a wireless sensor, for example an infrared sensor.

A second type relies on sensing movement of a sensor that is attached to or grasped by the user. For example, pointing devices, e.g., an electronic mouse, can detect movement in two dimensions, depending on the model. Smartphones and similar devices include position and orientation sensors that can sense movement of the device for input to any application the device can run. Handheld controllers for virtual reality translate hand movement into virtual hand movement in a virtual space.

Toy electronic wands that emit light or tactile vibration when grasped or waved about are also available. These toys lack the ability to control external devices. The user receives the mere pleasure of observing light or tactile emission from the wand. In certain cases, for such toy electronic wands, the aesthetic look-and-feel can be compromised due to visible physical seams required to incorporate one or more buttons into a wand casing. In other cases, plastic pull tabs, that insulates the battery, may be provided in the wand casing. The plastic pull tabs are pulled away when the wand casing is opened. The pulling away of the plastic pull tabs connects the battery and powers-on the device. Such an invasive mechanism requires a removable battery due to which the toy electronic wand may fail to be addressed as a single-piece rigid wand. Further, when such toy electronic wands are secured in the wand casing for a long time on-the-shelf, power levels of both the devices tend to substantially drain out, thereby failing to provide first-time user experience.

It is desirable to develop new methods, apparatus and systems for gesture-centric user interfaces, that enable users to control a variety of electronic devices or perform a variety of actions in the real world with gestures.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a gesture-recognition (GR) device made to be held or worn by a user includes an electronic processor configured by program instructions in memory to recognize a gesture. As used herein, a "gesture" is a pattern of movements, such as, for example, up-and-down, side-to-side, inward-outward and/or any combination thereof. The movements may be of a sensor integrated with an associated prop. In an aspect, a movement sensor is attached to (e.g., incorporated into the electronics of) the GR device. In another aspect, the GR device is capable of sensing 3-dimensional motion with up to six degrees of freedom (three linear axes, and three rotational axes), plus three axes of geospatial orientation if desired, using the movement sensor (e.g., an inertial measurement unit (IMU)).

To recognize a gesture, the processor of the gesture-recognition (GR) device detects a pattern of movements, classifies the pattern to a type or rejects it as unclassifiable, and associates the type (if any) to an electronic instruction. It may perform any or all these operations locally or remotely, using a heuristic algorithm, a rules-based algorithm, or a combination of heuristic and rules-based algorithm. In an aspect, the processor may access a library comprising a plurality of action identifiers associated with a plurality of gesture types to identify an action associated with the recognized gesture type from a library. As used herein, an "action" includes user-directed changes in machine states, for example, illuminating a light, extinguishing a light, retrieving content, playing content, jumping ahead or backwards in content, opening a door, or any of the innumerable things that a machine controlled by an electronic processor can do. In the context of a data library, an "action identifier" is data that enables the action to be identified, for example, a pointer, an instruction set or module, or other identification code. In a related aspect, the processor, or a processor of an associated interface device, may include instructions that enable a user to edit the associations between action identifiers and gesture types.

In another aspect, the processor of the GR device, or another in communication with it, may send a signal to one or more targeted ancillary devices, causing each ancillary device to execute instructions performing the identified action. For example, the processor may execute instructions to perform the identified action that include electronically transmitting signals to a second electronic processor located in a second device. The second device may be, or may include, at least one of a light, a television, a projector, a refrigerator, a personal smart device, an appliance, a virtual reality device, an augmented reality device, a display device, or a toy.

In related aspects, the gesture recognition device may include a light emitting device (LED), wherein the action may include altering a characteristic of light emitted from the LED device, such as, for example, its color, flashing rate, or intensity. The gesture recognition device may include an inertial measurement unit (IMU) configured to detect gestures in three-dimensional space, including gestures having six degrees of freedom (3 linear, 3 rotational) or less, plus three axes of geospatial orientation if desired. The electronic processor is configured to recognize the gesture based on signals received from the inertial measurement unit.

In some embodiments, classifying gestures by type and associating the action identifiers and gesture types may be done remotely, e.g., by a remote server or a mobile device, while characterizing a movement pattern as digital data is done by a processor of device that undergoes the movement. Thus, the GR device may initiate the first critical process in gesture recognition—converting a gesture into a wireless, machine-readable signal that can be characterized by type—without performing later operations in a chain of causation between a gesture by the user and an action by a target device. In other embodiments, the GR device may perform later operations in the chain of causation, up to but not including performing the action itself. The GR device may also perform local actions, for example, emitting sounds, vibrations, or lights, synchronized to the action performed by the targeted device. In an aspect, the GR device may perform local actions indicating other outcomes, such as a failure to classify a gesture of a recognizable type, or a failure to communicate an action identifier to a targeted device. In addition, the GR device may perform local actions indicating intermediate states, for example successful input of a gesture to type.

In other aspects, a system for providing a personalized experience may include a central electronic processor at a central location, an edge electronic processor near a first location, and a plurality of connected devices at the first location, wherein the central processor is configured to send instructions to control the plurality of connected devices at the first location to create a personalized experience for a user at the first location. The plurality of connected devices may include at least one of a user arrival notification system, a light, a mirror, a television, a projector, a virtual reality device, an augmented reality device, a speaker or a microphone.

The system may further include, in a computer memory, encoded information about capabilities of the plurality of connected devices at the first location. The information about capabilities of the plurality of connected devices at the first location may be in a database accessible by the central processor. In such embodiments, the central processor is configured to send instructions to control the plurality of connected devices at the first location to create a personalized experience for a user at the first location based on the capabilities of the plurality of connected devices at the first location. As used herein, a "personalized experience" means sensory output from the connected devices that is configured based on information defined by or for an individual user indicative of the user's preferences for the sensory output.

In an alternative, or in addition, the information about capabilities of the plurality of connected devices at the first location may be in a database accessible by the edge processor. In such embodiments, the central processor may be configured to send instructions to control the plurality of connected devices at the first location assuming full capabilities of the plurality of connected devices and the edge processor may be configured to receive the instructions and provide a personalized experience for a user at the first location based on the instructions and on capabilities of the plurality of connected devices at the first location to command a personalized experience for a user at the first location.

In an aspect, a GR device may be, or may be locally connected to, an edge processor of the system. The personalized experience may include controlling the plurality of connected devices at the first location according to a gesture-recognition library defined by of for a user of the GR device. In an aspect, an edge processor or the central processor may translate between In accordance with an aspect of the disclosure, a system may comprise a memory for storing instructions and a first processor for executing the instructions to perform a method. The method may comprise receiving a first signal based on an activation of a masked electrical switch by release of a magnetic assertion when a lid member of an interactive casing is disengaged from a base member of the interactive casing. The method may further comprise converting a first system state of the interactive casing to a second system state upon the receipt of the first signal. The method may further comprise generating audio-visual feedback to provide first-time user experience based on the conversion to the second system state from the first system state. The method may further comprise communicating a second signal to a GR device based on the conversion to the second system state from the first system state. Based on the received second signal, a first device state of the GR device is converted to a second device state. Power levels of a first power storage device of the interactive casing and a second power storage device of the GR device are maintained during the first system state and the first device state, respectively.

In accordance with an embodiment, the GR device is a wireless interactive wand or a smart wand configured to communicate wirelessly via a radio frequency (RF) or an infrared (IR) communication mode with the interactive casing and/or an external electronic device by utilizing power generated by the second power storage device.

In accordance with an embodiment, the first processor is controlled by a state of a magnetic assertion signal connected to an optional inverting of a first set of transistors to minimize a first current leakage from the first power storage device when the interactive casing is in the first system state, In accordance with an embodiment, a second processor is connected to and controlled by a power line signal of the first processor to minimize a second current leakage from the second power storage device when the GR device is in the first device state. The first system state and the first device state correspond to a ship mode state.

In accordance with an embodiment, the method further comprising enabling, by the first processor, a system power-on sequence when the interactive casing is in the second system state. The device power-on sequence is enabled when the GR device is in the second device state. The second system state and the second device state may correspond to a wake-up state.

In accordance with an embodiment, a top surface of the base member of the interactive casing comprises a longitudinal cavity. Boundary line of the longitudinal cavity is based on contours of the GR device. The longitudinal cavity is adapted to removably secure the GR device.

In accordance with an embodiment, the top surface of the base member of the interactive casing further comprises a flat portion under which the electrical switch and additional electrical components are masked.

In accordance with an embodiment, a bottom surface of the lid member, that engages with the top surface of the base member of the interactive casing, comprises a magnetic component. A detection of a magnetic-field induced by the magnetic component asserts or de-asserts the masked electrical switch when the lid member is engaged or disengaged from the base member.

In accordance with an embodiment, the conversion of the first system state to the second system state and a back conversion from the second system state to the first system state corresponds to a state cycle of the interactive casing. The conversion of the first device state to the second device state and a back conversion from the second device state to the first device state corresponds to a device cycle of the GR device.

In accordance with an embodiment, the method further comprising terminating, by the first processor, the state cycle of the interactive casing based on a detection of an established first communication channel between the interactive casing and an external device when the interactive casing is in the second system state, and/or another establishment of a second communication channel between the GR device and the external device when the GR device is in the second device state. The termination of the state cycle prevents the back conversion from the second system state to the first system state.

In accordance with an embodiment, a device cycle timer of the GR device is delayed or reset by a second processor based on a detection of a first movement of the GR device and/or a second movement of a user handling the GR device.

In accordance with an embodiment, the method further comprising converting, by the first processor, the second system state to the first system state based on a detection of an unestablished first communication channel between the interactive casing and an external device and/or another unestablished second communication channel between the GR device and the external device over a pre- In accordance with an embodiment, the method further comprising converting, by the first processor, the second system state to the first system state based on a detection of a zero first movement of the GR device and/or a zero second movement of a user handling the GR device over a pre-defined time period.

In accordance with an embodiment, the method further comprising converting, by the first processor, the second system state to the first system state based on an assertion of the masked electrical switch in the interactive casing via a presence of a magnetic-field induced by a magnetic component in the lid member over a pre-defined time period.

In accordance with an embodiment, the conversion of the first system state and the first device state to the second system state and the second device state, respectively, is independent of a touch assertion by a user on the GR device.

In accordance with an embodiment, the first power storage device of the interactive casing and the second power storage device of the GR device correspond to non-removable rechargeable batteries.

In accordance with an embodiment, the method further comprising communicating, by the first processor, the second signal to a second processor of the GR device, via the first processor of the interactive casing. Based on the second signal, the first device state of the GR device is converted to the second device state by the second processor.

In accordance with an embodiment, the method further comprising communicating, by the first processor, the second signal to a second processor of the GR device. Based on an instruction from the first processor in response to the receipt of the second signal, the first device state of the GR device is converted to the second device state by a second processor during a wake state or a full power-on state.

In accordance with an embodiment, the method further comprising transmitting, by the first processor, a power signal to a second processor of the GR device via one of a physical power transfer mechanism or a wireless power transfer mechanism.

In accordance with another aspect of the disclosure, the method may comprise receiving, by a first processor of an interactive casing, a first signal based on an activation of a masked electrical switch by release of a magnetic assertion when a lid member of the interactive casing is disengaged from a base member of the interactive casing. The method may further comprise converting, by the first processor, from a first system state to a second system state of the interactive casing upon the receipt of the first signal. Power levels of a first power storage device of the interactive casing and the second power storage device of the GR device are minimally drained during the first system state and a first device state, respectively. The method may further comprise generating, by the first processor, audible feedback to provide first-time user experience based on the conversion to the second system state from the first system state. The method may further comprise communicating, by the first processor, a second signal to the GR device based on the conversion to the second system state from the first system state. Based on the received second signal, the first device state of the GR device is converted to a second device state. The method may further comprise generating, by the first processor, visual feedback to provide the first-time user experience based on the conversion to the second device state from the first device state. The method may further comprise converting, by the first processor, from the second system state of the interactive casing to the first system state based on an operational event.

In accordance with an embodiment, the operational event corresponds to one of: a first detection of an unestablished first communication channel between the interactive casing and an external device and another unestablished second communication channel between the GR device and the external device over a pre-defined time period, a second detection of a zero first movement of the GR device and/or a zero second movement of a user handling the GR device over a pre-defined time period, or based on an assertion of the masked electrical switch in the interactive casing via a presence of a magnetic-field induced by a magnetic component in the lid member over another pre-defined time period.

As used herein, a "client device" or "device" includes at least a computer processor coupled to a memory and to one or more ports, including at least one input port and at least one output port (e.g., a desktop computer, laptop computer, tablet computer, smartphone, PDA, etc.), including accessories such as wands, rings, and staffs so equipped. A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagrams relating what is known to novel aspects of the present disclosure.

Figure 1:
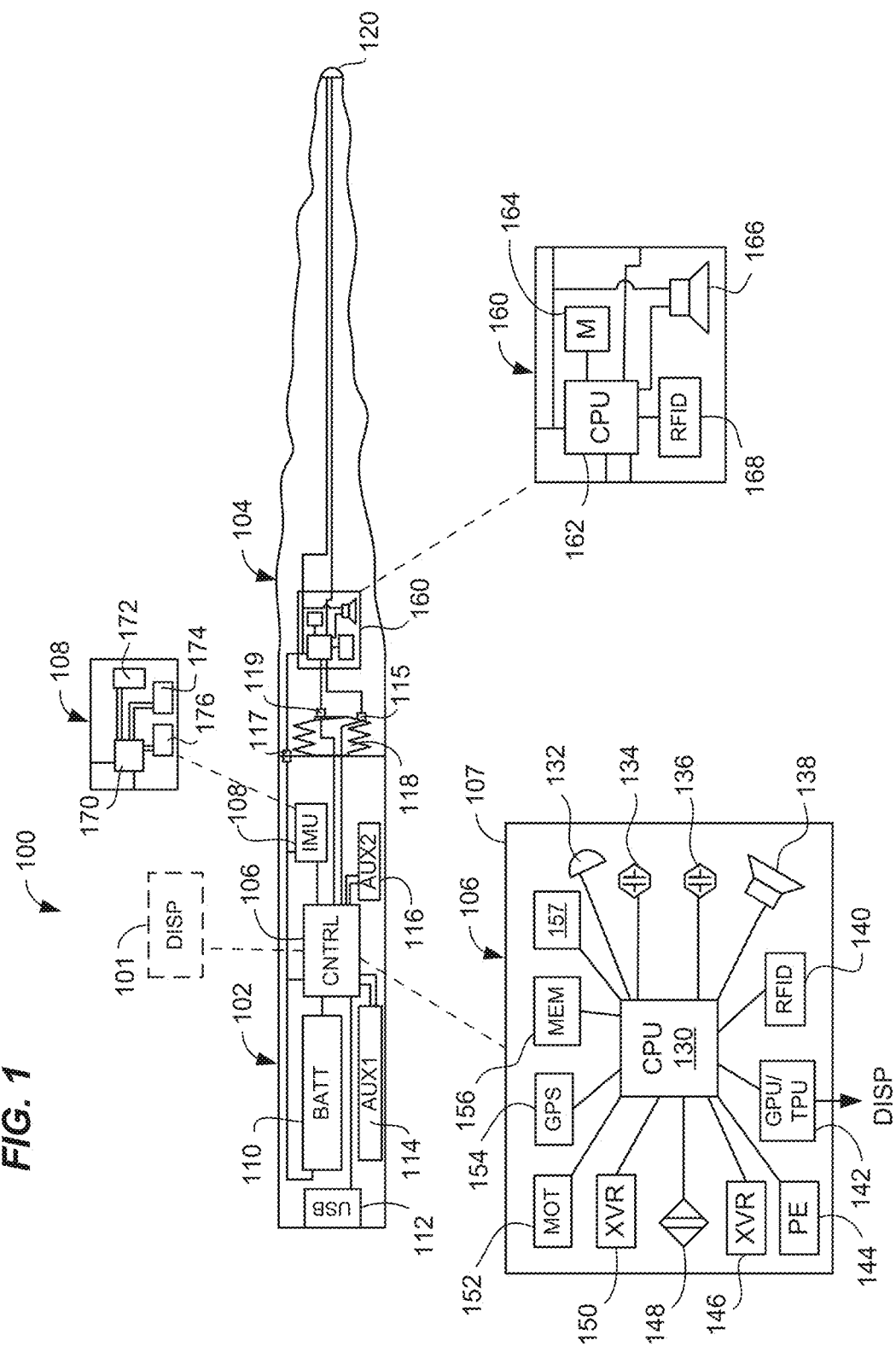
FIG. 1 is a diagram illustrating a GR device and components thereof.

Referring to FIG. 1, gesture-recognition (GR) device 100 may be used with one or more connected devices to provide enhanced experience at home, retail locations, theme parks, theaters and other locations. The GR device may include a controller 106 (e.g., a Raspberry Pi 0W) configured to perform operations of the GR device 100, including detecting different gestures formed by motion of the GR device and triggering correlated actions to be performed by connected devices, for example, devices 201-213 shown in FIG. 2, in response to each gesture. In accordance with various embodiments, the controller 106 may be interchangeably referred to as a microcontroller (MCU), without any deviation from the scope of the disclosure. The connected devices 201-213 to be individually described later may each perform an action determined based on a gesture performed by user 99 holding or wearing the GR device 100, to provide an enhanced personalized experience. The user moves the GR device through a pattern of motion, and with or without a verbal command, one of the connected devices performs a desired action. A good deal of hardware and software makes this appearance of magic possible.

Referring again to FIG. 1, an embodiment of the GR device 100 may include two principal components, a base unit 102 and an elongate unit 104. In some embodiments, the base unit 102 and the elongate unit 104 may be configured as a single piece. For a GR device 100 styled as a wand, the base unit 102 may be configured to be grasped by the user's hand, while the elongate unit 104 may be configured to have a form factor of a wand tip that extends outward from the base unit 102 and provides the wand's overall appearance. In some embodiments, the extendable unit 104 may be configured to be removably attached to the base unit 102. In some embodiments, the base unit 102 may be permanently fixed to the elongate unit 104. In some implementations, all the electronics may be placed in the base unit 102 while the elongate unit 104 can be devoid of any electronics. In some other implementations, a first portion of the electronics may be disposed in the base unit 102 and a second portion of the electronics may be disposed in the elongate unit 104. For example, heavier, more expensive electronic components may be placed in the base unit 102 while relatively inexpensive electronic components may be placed in the elongate unit 104. The elongate unit 104 may be provided with different appearances and capabilities to suit users' needs.

To provide interchangeability, a removable fastener 118 with electrical contacts 115, 117, 119 may be used to couple the base and elongate units 102, 104. While an internally-threaded coupling is shown, other couplings may also be suitable, for example, an externally threaded plug-and-socket, a threadless plug-and-socket with or without a locking feature, and so forth. Since the GR device is designed to be moved rapidly around, a locking feature is advantageous to prevent undesired decoupling.

Capabilities of the GR device 100 may be limited or enhanced depending on an identity of a user of the GR device 100 or the elongate unit 104. For example, the elongate unit 104 may include a radio-frequency identification device (RFID) 168 or other identification device, and a gesture recognition and control system of the GR device 100 may be configured to work differently depending on the identity of the elongate unit. For example, special commands may be "unlocked" for certain identifiers. In home settings, commands may be refused except from movements of GR devices that include identifiers registered for a household. As another example, special commands may be unlocked depending on the identity of a user. Information regarding the identity of a user may be communicated to the GR device 100 via one or more connected devices associated with the GR device 100.

While a wand is illustrated, it should be appreciated that a GR device 100 may have any suitable form factor for being held or worn by a user and carried by movements of a user's extremities. For example, a GR device 100 may be styled as a walking staff, a light stick, a ring, a body ornament, a glove, a bracelet, or any article capable of being held and moved through the air by a user. For further example, in a ring, bracelet, or similar jewelry, the base unit 102 may be contained in the body of the jewelry while the elongate unity 104 may be styled as a gem or ornament.

Ornamental features aside, operation of the GR device 100 depends on its internal circuitry and elements in its wireless network. The internal circuitry of the GR device 100 may include a controller 106 coupled to an inertial measurement unit (IMU) 108, to a power storage unit 110 (e.g., a battery), and to an input-output and power connector 112 (e.g., a Universal Serial Bus (USB) port). Optionally, the controller may be coupled to one or more auxiliary devices 114, 116, described in more detail herein below, and to electronics in the elongate unit 104, for example, one or more light-emitting devices (LEDs) 120 and accompanying controller 160, if any.

The IMU 108 (e.g., sensor BN0055 from Bosch) may include one or more accelerometers 172 for acceleration detection, one or more gyroscopes 174 for force and movement detection, and a magnetometer for geographic orientation. The GR device mat include one or more IMUs 108, which may be in the base unit 102, the elongate unit 104, or in both the primary and elongate units. The IMU may include a processor 170 that determines from sensor data magnitude and direction of motion in up to three spatial axes, three rotational axes, and three geospatial orientation axes, or other useful metric for determining pattern of movement and the associated gestures, using any desired coordinate system (e.g., Cartesian or spherical) and any useful sampling interval, such as for example, 0.1 to 100 milliseconds. The IMU 108 may output other useful information, for example, its geospatial orientation. When the wand 100 is moved in space to perform a gesture, data from the accelerometer, the gyroscope and/or the magnetometer of the IMU 108 is processed by the processor 130 to detect the pattern of movements, identify the gesture and associate it with an action to be performed by a connected device. As described in more details herein, the processor 130 may access local or remote data structures and servers to complete identification of the gesture and selection of an appropriate associated action. The processor 130 may execute the identified action (e.g., illuminating LED 120 with a specific color or emitting a predetermined sound from an audio transducer 138, 166), cause instructions to be sent to a connected device, or both.

The controller 106 may include a processor 130 coupled to a random access memory (RAM) 156 holding program instructions and data for rapid execution or processing by the processor during operation. When the apparatus 100 is powered off or in an inactive state, program instructions and data may be stored in a long-term memory, for example, a non-volatile magnetic, optical, or electronic memory storage device 157. Either or both of the RAM 156 or the storage device 157 may comprise a non-transitory computer-readable medium holding program instructions, that when executed by the processor 130 cause the GR device 100 to perform operations as described herein for gesture recognition and control, alone, or in combination with one or more additional processors. The one or more additional processors may be coupled locally to the processor 130, remotely via a wireless connection, or both. Program instructions may be written in any suitable high-level language, for example, C, C++, C#, JavaScript or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. In other words, the modules may be high-level modules only.

To assist with personalization and operation of the GR device 100, the controller 106 may be attached to various other input and output devices, arranged with it on a module circuit board 107 and/or elsewhere in the GR device 100, for example arranged onto a single circuit board within the GR device 100. For example, the controller 106 may be attached to a microphone 132 to receive voice commands, and an audio transducer (e.g., a speaker or piezoelectric device) for audio output. The controller 106 may include a graphics or text processing unit 142 providing a signal for controlling output of an electronic text or graphic display 101. The display 101 may be integrated with the base unit 102 or may be provided in an auxiliary device (e.g., a smartphone) that couples to the processor 130 via one or more wireless transceivers 146, 150. The transceivers 146, 150 may support one or more protocols, for example 5G, Bluetooth, NFC or WiFi. The display 101 may display text, picture or video animations based on a gesture input. The processor 130 and memory 156 may be configured with one or more modules for speech to text conversion, gesture to speech conversion, or gesture to text conversion. In an alternative, the display 101 may be used as a user interface for configuring the GR device. The controller may include a motion controller 152 for driving an electric motor of a rotational, vibrational, or pulsating feature installed near an externally-facing surface, e.g., at block 116 in base unit 102. The controller 106 may include an ambient light sensor 134 to detect ambient light levels, a skin conductance sensor 136 for biometric sensing, a proximity detector 148 to detect when the device is in proximity of other connected devices, an RFID sensor 140 for reading identifiers from an RFID device 168 of the elongate unit 104 or other device, a particle (e.g. smoke or vapor) emitter for special effects, and a geolocating device (GPS) receiver 154.

It may be advantageous to locate certain sensors or output devices at, on or near an external surface of the GR device 100, for example at block 114 (Auxiliary 1). Suitable devices located may include, for example, a biometric sensor such as an electrode array to detect heart rate of the user, a thermistor to detect skin temperature, the skin conductance sensor 136, the particle emitter 144, a scent detector or emitter, a fingerprint reader for user authentication, and/or a heating element to enable the device to heat or cool based on gesture input.

In various embodiments, an ancillary controller 160 may be used to augment capabilities of the primary controller. As illustrated, the ancillary controller includes a processor 162 and memory 164 holding program instructions for controlling one or more LEDs 120 and an ancillary audio transducer 166. The controller may include an ID device 168 for positively identifying the model and serial number of the elongate unit 104, in support of interchangeable variety in program functions and system security. The controller 160 may include any one or more devices and sensors described in connection with 106, for example, a second IMU. Separated IMUs in the base and elongate units 102, 104 may be useful for more sophisticated gesture recognition, especially for flexible GR devices. For example, a glove configured as a GR device with multiple IMUs to capture motion of each separately movable part of a hand may be used to detect the full complexity of human language (e.g., American Sign Language). In embodiments, the 162 and memory 164 may be omitted, and local processing may be implemented only in the base unit 102, e.g., processor 130.

Figure 2:
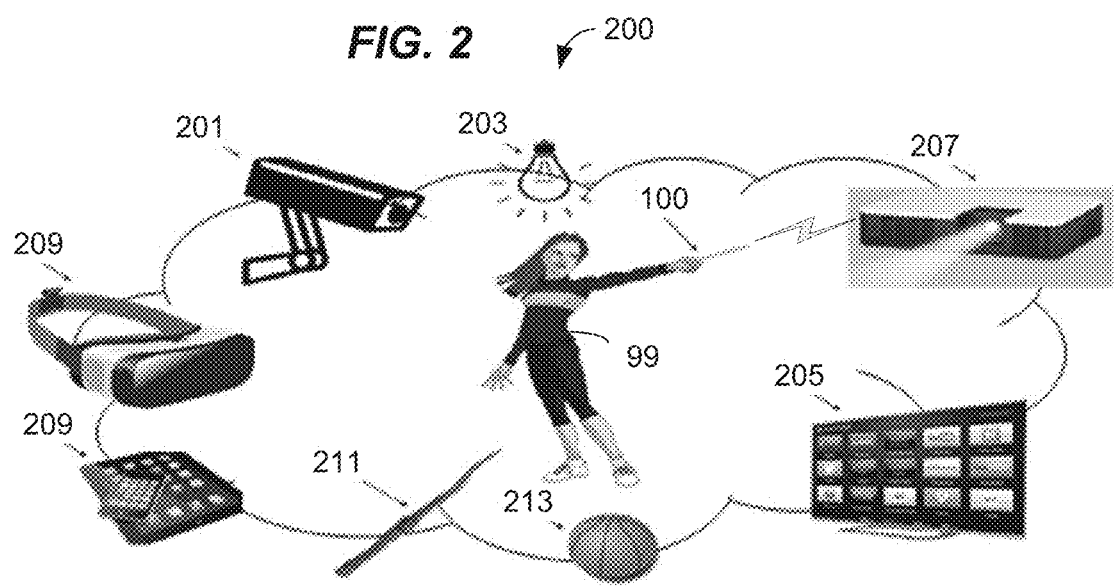
FIG. 2 is a diagram illustrating use cases for a GR device in a connected environment.

Before describing more technical features of the GR device and related systems and methods, applications for gesture recognition by a GR device will be described, in context of a connected environment 200 as shown in FIG. 2.

In an aspect, a GR device 100 may be configured as an Internet of Things (IoT) device, for example, a camera 101 or a light control module 203 may be controlled by the GR device 100. The GR device 100 may be configured to activate other connected devices based on gestures and/or voice commands of a user 99. For example, gestures can be used control lights, fans, air conditioners, toasters, refrigerators, doors, garage doors, cars, vacuum cleaners and other home appliances. In some implementations, the CR device can directly interact with another IoT device. However, in other implementations, the GR device may be configured to interact with other IoT devices through an intermediary system such as, for example, Google Home, Alexa, or other IoT hub.

In another application, a GR device may be configured to interact with a variety of toys 211, 213 (e.g., balls, cars, vehicles, dolls, robots, etc.) For example, gestures by the user 99 holding the GR device 100 may be used to control movement of a vehicle, a ball, or a figure (e.g., doll or robot). The toys may be configured as IoT devices, or as wireless devices configured for direct connection to the GR device or indirect connection through an auxiliary device (s).

In other applications, a GR device 100 may be used to provide a variety of augmented reality (AR) or virtual reality (VR) experiences 209. Gestures may be used to control virtual objects in a VR environment, for example, by communicating gestures detected by the GR device 100 to a VR device worn by the user to control one or more virtual objects. Gestures may also be used to control virtual objects in an AR environment. In this scenario, one or more virtual objects can be overlaid over objects in the real world (e.g., a virtual ball/feather is placed on a table in the real world). The gestures detected by the GR device 100 may be communicated to the AR device 209 worn by the user to control one or more virtual objects.

A GR device may be used to enhance entertainment presented over a television 205, notepad computer 209, projector 207, or other content delivery device. For example, gestures made with the GR device may be used to interact with real and/or virtual objects or projected images to unlock additional content and/or bonus features (e.g., additional scenes, making of the scene, etc.) in an entertainment setting (e.g., at a theater/a theme park/cruise ship/some other entertainment setting). Gestures with the GR device may be used to enhance the experience of watching a movie or playing a game. For example, gestures can be used to add content to a scene when watching a movie or a game. As another example, gestures can be used to control the narrative of a movie. The device can light-up, vibrate and/or buzz at climactic movements while watching a movie or a show.

In the area of retail sales, a GR device 100 may be configured to identify an item selected by the customer using gesture control. If the item is wearable (e.g., clothing, footwear, headwear, accessory, or the like) a retail experience system in communication with the GR device 100 may be further configured to display or project an image of the customer wearing the selected item in the customer's size based, on a gesture made by the GR device 100. The image can be displayed on a display device (e.g., a smart phone, a smart mirror, a computer, a smart pad, etc.) or projected in the ambient environment. The customer can use gesture control to change the size and/or color of the selected item of clothing/shoe. The customer can perform another gesture to buy the selected item of clothing/shoe. The selected item of clothing/shoe can be delivered to a preferred location of the customer.

For social applications, a GR device 100 may be personalized to the user. For example, a GR device 100 may be configured to recognize the user's biometric/voice and retrieve personal information associated with user (e.g., name, birthday, affiliations, preferences, and so forth). As another example, a GR device 100 can provide a unique user identifier to a user recognition system which can further retrieve personal information associated with user (e.g., name, birthday, affiliations, preferences, and so forth). The retrieved personal information can be used to recognize the user at theme parks, retail locations, theaters, or other venues; keep track of rewards, offer redemption of rewards, provide personalized service, customize offers, or other communication actions. Personal information retrieved with permission via a user's GR device can be used to greet the user upon entry into a space, alter the colors or other decorations of the space to reflect the user's affiliations/preferences. The retrieved personal information can also include a list of the user's friends or other people associated with one or more social groups that the user belongs to. The GR device may be configured to receive information of the user's friends or other people associated with one or more social groups that the user belongs to in the user's vicinity and alert the user to their presence to facilitate social interaction. Further to enhance social communication, a GR device may be equipped with gesture to speech conversion or gesture to text conversion capabilities. Accordingly, a GR device may facilitate communication between individuals who don't speak the same language. These capabilities can also be beneficial to individuals with disabilities. As a geospatial locating device, a GR device may be used as, or as part of, a navigation instrument capable of providing turn by turn directions from origin to destination to a user.

A GR device may be used to enhance a consumer experience at a retail location and encourage sales. In an illustrative application, a user is notified via an application (e.g., a magic/fantasy app) on a personal smart device (e.g., an Android device, iPhone, etc.) that he/she is now eligible to purchase an item (e.g., a special robe, a special toy, an accessory, etc.) from a retail location. The user's arrival at the retail location may be communicated by the application on the user's personal smart device to a user arrival notification system located in the vicinity of entrance of the retail location. Thus, when the user arrives at the retail location, a retail greeting system or the application may welcome the user with a personalized greeting. The personalized greeting may include, for example, the user's name, the name of the item they wish to purchase, the area of the retail location where the item is stored, and other pertinent information.

Figure 3:
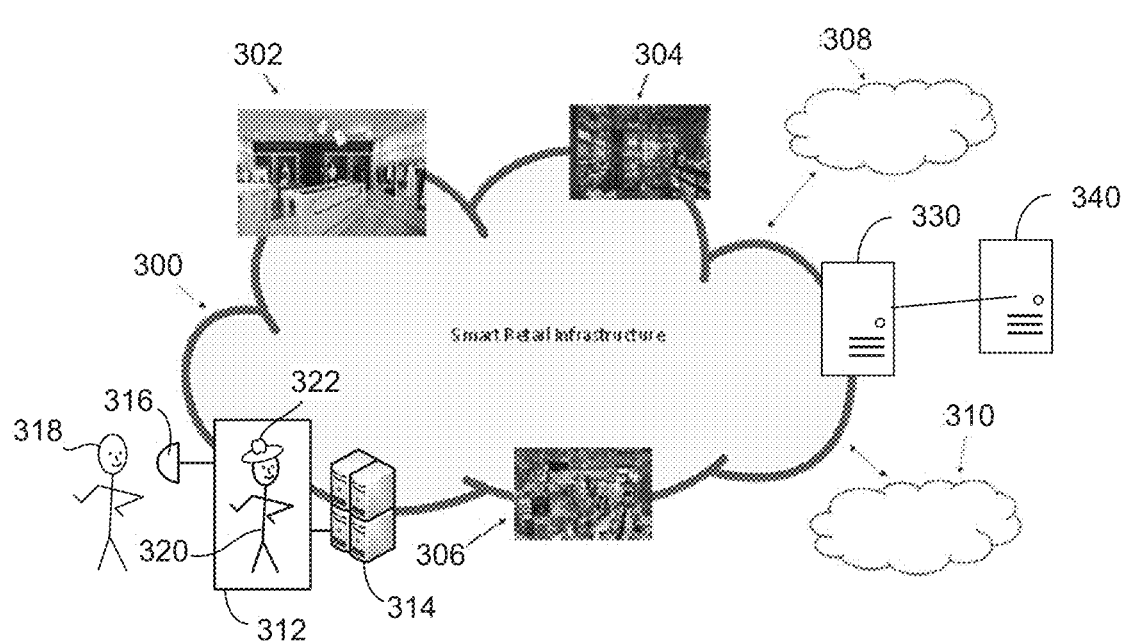
FIG. 3 is a diagram illustrating a smart retail environment embodying an aspect of a system for providing a personalized experience.

The user arrival notification system may be a part of a smart retail infrastructure 300, illustrated in FIG. 3. The user arrival notification system can include a communication system configured to receive information from the application on the user's personal smart device. An implementation of a smart retail infrastructure is described below. In some implementations, the smart retail infrastructure may receive some or all the relevant user information from the application on the user's personal smart device at the time of receiving the user's arrival information. For example, the smart retail infrastructure may receive some or all the relevant user information from one or more databases (e.g., databases located in the cloud). The relevant user information may be retrieved from the cloud based on information received from the application on the user's personal smart device.

At the retail location, the user may be provided with a generic wand (e.g. GR device 100) if the user doesn't already have a personal wand of their own. The wand can be configured to guide the user to the location where the item to purchase is located. For example, the wand may vibrate or illuminate when the user points the wand in the direction of the location of the item to purchase. The wand may be used in conjunction with a map of the retail location that is displayed by the application on the user's personal smart device. The wand may be configured to provide turn by turn directions to the user in the retail location to guide the user to the location of the item to purchase. The wand may be configured to buzz, vibrate, become hot/cold, light-up and/or point to guide the user to the location of the item to purchase.

Upon reaching the location of the item to purchase, the smart retail infrastructure may prompt the user try on the item for size when the item to purchase is an article of clothing, footwear, headgear, eyewear, jewelry or some other wearable accessory. The smart retail infrastructure may prompt the user via the user's personal smart device, via speakers deployed in the retail location and/or via speaker of the wand. In some implementations, the user may try on the item virtually.

In an aspect, the smart retail system may include a smart mirror 312, comprising a computer display coupled to a camera 316, and a video server 314. The smart mirror at the retail location may display an image 320 of the user 318 wearing the article of clothing, footwear, headgear, eyewear, jewelry or some other accessory 322 (headgear only shown). In another aspect, the smart mirror can be configured to detect and note the user's emotional response to the appearance in the smart mirror, for example the user's facial expression indicating satisfaction or displeasure. In some implementations, the smart mirror and/or the application on the user's personal smart device may offer size or color recommendations to the user. The size or color recommendations may be made based on the user's preference, the detected emotional response with the item being tried on and other considerations. A display or audio output of the smart mirror 312 or the application on the user's personal smart device may request the user to confirm the color and/or size of the item and perform a predetermined purchasing gesture if the user wants to purchase the item. The purchasing gesture may be detected by the GR wand and transmitted to the smart retail infrastructure directly or via the user's personal smart device. Upon receiving notification of the purchase, the smart retail infrastructure may be configured to trigger congratulatory messages (e.g., triggering a light show in the vicinity of the user, causing the wand to light up/buzz/vibrate, issue verbal confirmation of the purchase, etc.) to confirm the purchase. The user may be notified (e.g., via the smart personal device) that the item will be delivered to a preferred delivery location.

The application on the user's personal smart device may be configured to notify the user regarding the presence of friends and/or other members in the user's social groups in the retail location. The application on the user's personal smart device may display the location of the user's friends and/or other members in the user's social groups on a map. The wand in conjunction with the application on the user's personal smart device may guide the user to the location of the user's friends and/or other members in the user's social groups. The map of the retail location may reveal hidden places within the store location which are accessible to the user and his friends. Special items and/or discounts may be available to the user and his friends when the access the hidden places through the map.

The retail location may include other activities to facilitate social interaction, such as, for example, photobooth, food stalls, etc. Further details of a smart retail infrastructure 300 may include a plurality of retail locations 302, 304, and 306 connected to the smart retail infrastructure 300. Each retail location 302, 304, and 306 may be associated with a unique store identifier. Each retail location may include a plurality of connected devices, such as, for example, communication devices at the entrance and various other locations in the retail location, lights, projectors, televisions, speakers, microphones, or other connected devices. The plurality of connected devices in each retail location are a part of the smart retail infrastructure 300. The smart retail infrastructure can interface with other cloud infrastructures 308 and 310.

The smart retail infrastructure 300 may include information regarding the capabilities of the various connected devices in each retail location. Accordingly, the smart retail infrastructure can customize the user experience in each retail location based on the capabilities of the various connected devices in each retail location.

For example, if a retail location 306 does not have a smart mirror, then the smart retail infrastructure may prompt the user to use his/her personal smart device to virtually try on the item to purchase. As another example, if the lights in the retail location 304 are not capable of changing colors, then the smart retail infrastructure may not use the light effects in creating user's retail experience.

In some implementations, each retail location may be provided with edge computing device or server 330. In such implementations, the capabilities of the various connected devices in the retail location may be stored at the edge of the smart retail infrastructure within the edge computing device 330. A central processor 340 of the smart retail infrastructure may create a user experience that is common to all the retail location assuming full capabilities of the various connected devices. Individual edge computing devices may tailor the user experience for the individual retail location based on the capabilities of the connected devices.

Figure 4:
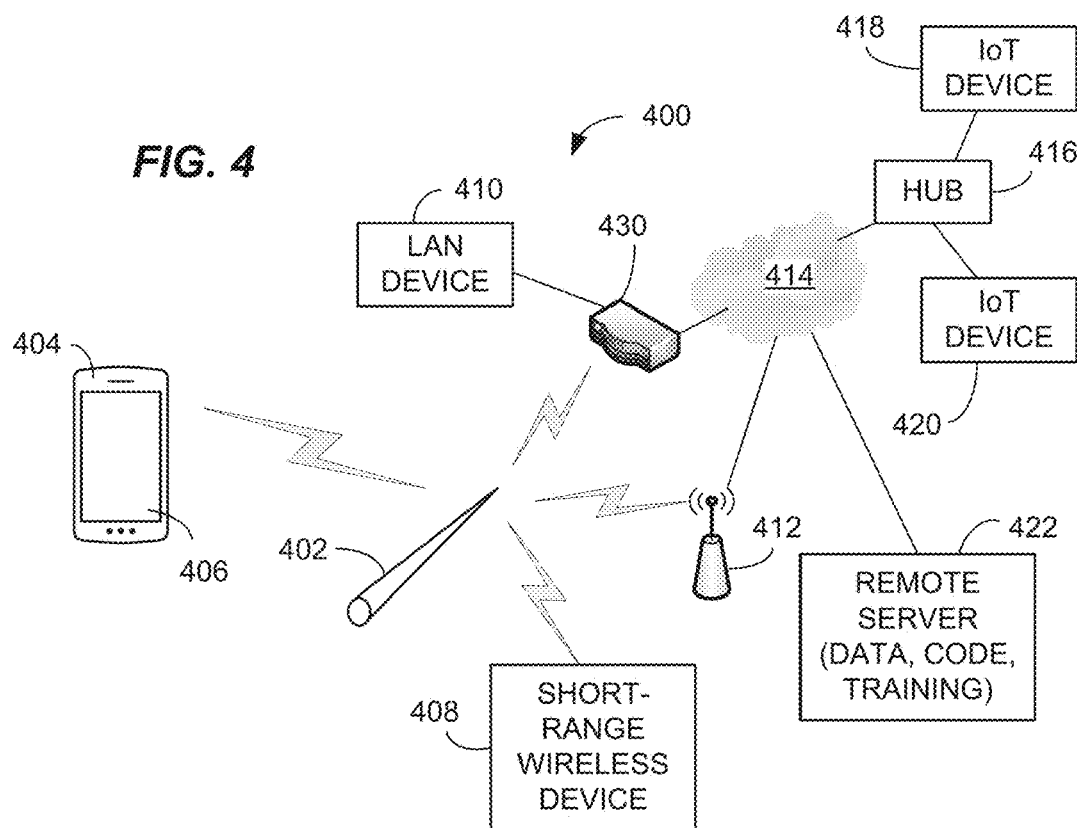
FIG. 4 is a system diagram illustrating hardware components of a system for providing a personalized experience, including a GR device.

FIG. 4 shows additional components and aspects of a gesture recognition system 400 for use with applications described herein, for interacting with a GR device 402, which may be the same as or similar to the GR device 100 previously described. The system may include a smartphone 404 with touch screen display 405 in wireless communication with the GR device 402. The GR device 402 may communicate with local connected devices, e.g., LAN client device 410, via a router 430. The GR device may communicate with a short-range wireless (e.g., Bluetooth) client device 408 via a peer-to-peer wireless link. The GR device 402 may communicate with wide area network (WAN) IoT clients 418, 420 via a hub server 416 (or without the hub, as applicable), WAN 414 and router 430 or wireless access point 412. Likewise, the GR device 402 may connect with one or more remote servers 422, that may provide resources for gesture recognition, for example, library data, or code execution for gesture recognition or gesture recognition training. For example, a remote server 422 may classify gestures by type and associate the action identifiers and gesture types, while characterizing a movement pattern as digital data is done by a processor of the GR device. In various implementations, the GR device may initiate the first step in a gesture recognition process—converting a gesture into a wireless, machine-readable signal that can be characterized by type—without performing later operations in a chain of causation between a gesture by the user and an action by a target device. In other embodiments, the GR device may perform later operations in the chain of causation.

Figure 5:
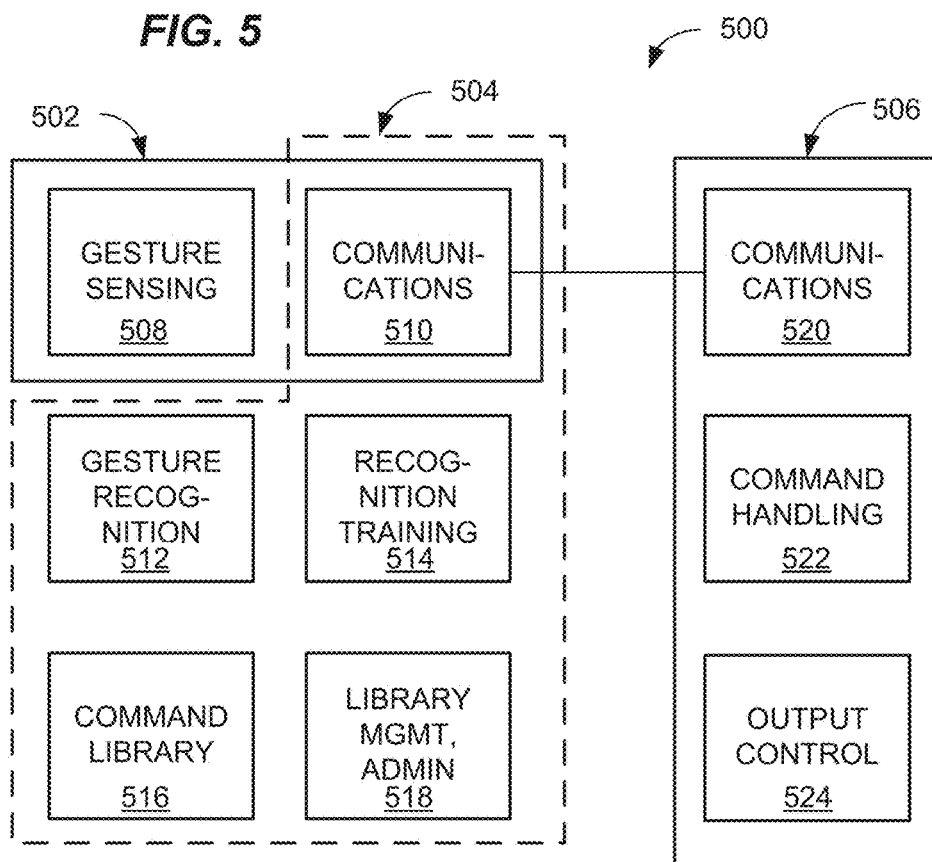
FIG. 5 is a block diagram illustrating programmable components of a system for providing a personalized experience, including a GR device.

FIG. 5 shows programmable components of a GR system 500 for providing a personalized experience, including a GR device. Block 502 encompasses critical components of a GR device for local execution. Dashed block 504 encompasses components that may be executed by a remote server, by the GR device, or both. Block 506 encompasses components of a connected device that performs an action determine by the GR system 500, for example connected clients as described in connection with FIG. 2. Gesture sensing 508 is performed locally by sensors and at least one signal processor of the GR device, as the user moves the GR device in space. As used herein, gesture sensing can refer to the detection of pattern of movements. The GR device and remote server, if any, may include a communication module 510 for communicating data and instructions with each other and with the connected client 506 via its communication module 520, which may be, or may include, for example, a standard IoT interface. The GR device 502 and/or remote server 504 may include a gesture recognition module 512 that classifies certain patterns of movement into specific categories, also called types or gestures. The GR device 502 and/or remote server 504 may further include a command library or data structure module 516 that associates gestures with action identifiers (e.g., commands).

The GR device 502 and/or remote server 504 may further include a training module 514 for configuring new patterns of movement as gestures to be recognized by the system 500. Thus, a user may configure their own gestures and expand their gesture libraries. The GR device 502 and/or remote server 504 may further include an administration and management module 518 for adding, deleting, and editing entries in their command library. Thus, a user or administrator may manage and alter library content for changing circumstances and needs.

A client device 506, also called a target or target device, need only be capable of receiving a command via a communications module 520, processing the command signal by an information processing (including command handling) module 522, and controlling its output accordingly via an output control module 524. Communications protocols used by the client 506 may be standard protocols, e.g. IoT, Bluetooth, so connection with any device capable of connecting via a common protocol is possible.

Figure 6:
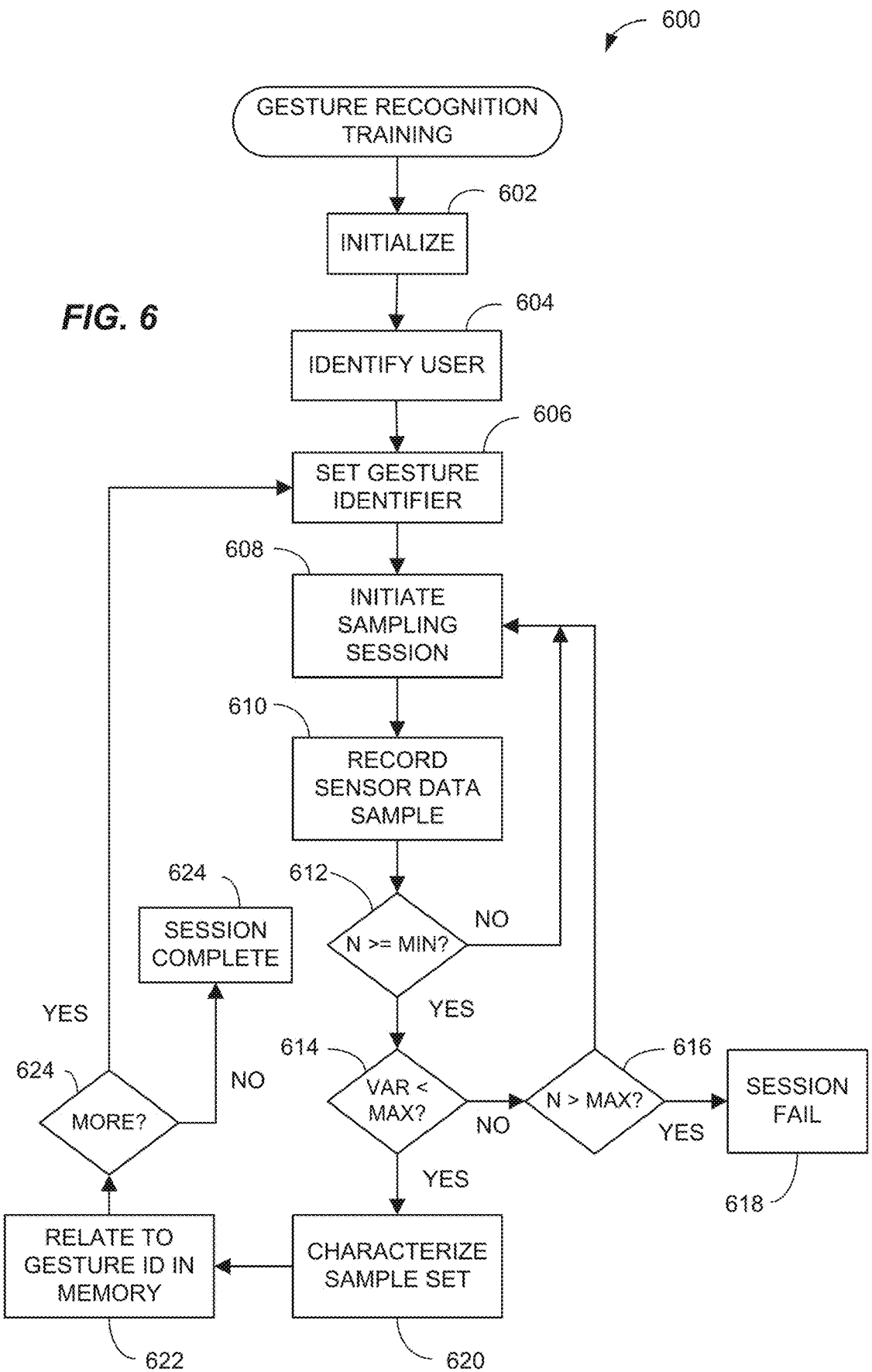
FIG. 6 is a flow chart illustrating aspects of gesture recognition training for use in or with a GR device.

Before a GR system (e.g., system 500) can recognize a pattern of movements, it may need to be programmed or trained to do so. Rules-based algorithms for pattern recognition may be programmed manually or semi-automatically, while heuristic algorithms (e.g., neural networks) may be trained using training sets. In both cases, an envelope for each gesture is defined. Gestures that fall within the envelope are classified (recognized) while those that fall outside the envelope are not classified (unrecognized). FIG. 6 shows aspects of gesture recognition training method 600 for use in or with a GR device and/or system 100, 402, 500. Gestures may be personalized for each user or user cohort, standardized for all users, or defined by both standard and personalized factors.

At 602, a processor initializes a training session, for example, in response to user or system input requesting training for a new or existing gesture. At 604, the processor may identify the user of the GR device, which may determine which gesture library the gesture belongs to. At 608, the processor may initiate a sampling session, for example, immediately after causing the GR device to emit an audible tone indicating training is to begin. At 610, the processor records motion sensor data for an interval of time, or until motion ceases, depending on the type of gesture. At 612, the processor determines whether a number of recorded samples 'N' is greater or equal to a minimum number of samples. If N is less than a minimum needed to characterize a gesture envelope, the processor reverts to record another sample at 608. If N is not less than a minimum, then the processor at 614 determines whether variance between recorded samples is less than a threshold of maximum acceptable variability. If variability is too high and the number of samples recorded exceeds a maximum number at 616, the training session fails at 618. If variability is too high and the number of samples recorded does not exceed the maximum, then the processor reverts to record another sample at 608.

If variability is within acceptable limits at 614, then the processor characterizes the sample set for the gesture at 620. For a rules-based recognition algorithm, a sample may be characterized using statistical tools, for example, mean and standard deviation, in comparing motion values across comparable intervals of time. For heuristic algorithms, a neural network or other heuristic process receives feedback from the user regarding acceptable and unacceptable sample gestures until it can accurately predict whether a motion pattern qualifies as a gesture.

At 622, the processor relates the data characterizing the gesture envelope (e.g., statistical ranges or parameters of a heuristic machine) to the identifier determined at 606 in computer memory, for example, in a library database. At 624, if the user wishes to train the system for another gesture, the processor reverts to block 606 for a new identifier. Otherwise, the processor completes the session at 624, for example by signaling the user and/or other devices in the system that the training session is complete.

Figure 7:
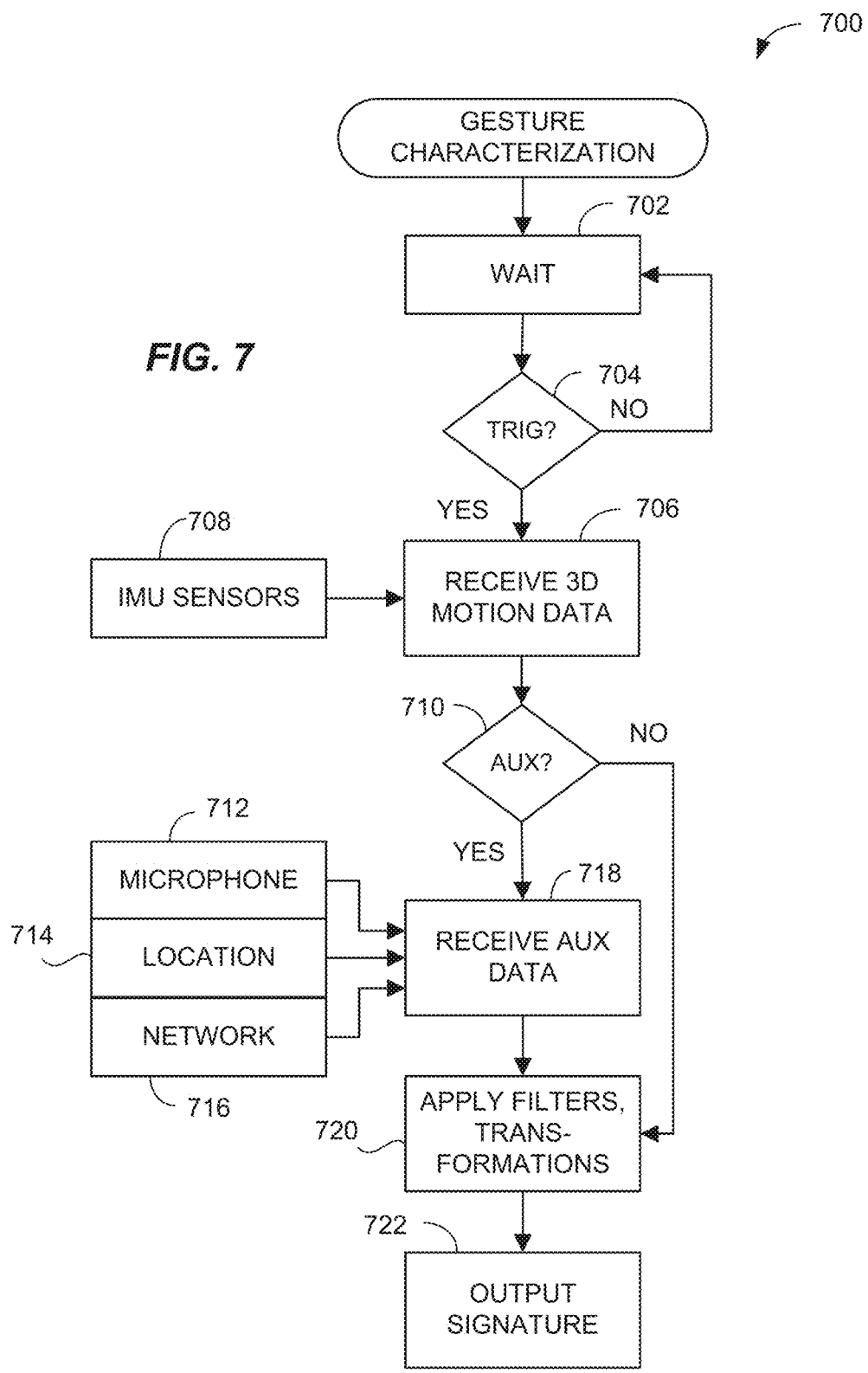
FIG. 7 is a flow chart illustrating aspects of characterizing a data signature for use in or with a GR device.

FIG. 7 shows aspects of a method 700 for characterizing a data signature for use in or with a GR device. The method may be used whenever desired to receive and recognize gesture input for applications as described herein. At 702, the processor waits for gesture input to begin. To avoid wasting processor resources, a user may deactivate the GR device's sensing capability when not needed, to prevent continual processing of random movement data. Thus, a trigger for gesture sensing may include a manual activation of the sensing function coupled with movement of the GR device. Manual activation may include, for example, receiving a spoken command, e.g., "abracadabra!" from the user. At 704, the processor waits until a trigger is received. Once the trigger is received, at 705 the processor receives 3D motion data from one or more IMU sensors. The data may include 3 spatial, 3 rotational, and 3 geospatial orientation axes as previously described, or some lesser subset of these 9 axes.

At 710, the processor determines whether any auxiliary data (e.g., a verbal command, or other input) is to be included as input to defining the gesture signature. This may be determined, for example, based on user preferences or other definition of data making up gesture input. Auxiliary data from a local microphone 712 may be used to supply a verbal component, such as a word or sound that included as part of the gesture. A location sensor 714 or example a GPS sensor, may be used to provide location data to constrain operation of the gesture to the present location. A network sensor 716 may similarly be used to provide network address data to constrain operation of the gesture to definite nodes of a network. Gesture definition is not limited by these examples. At 718, the processor receives the auxiliary data contemporaneously with receiving the motion data 706, or a short interval before or afterwards. At 720, the processor applies filers and transformations (e.g., Fourier transforms) to efficiently encode the gesture data for later recognition. An encoded gesture may be referred to herein as a "signature" or "gesture signature." At 722, the processor outputs the signature for downstream processing.

Figure 8A:
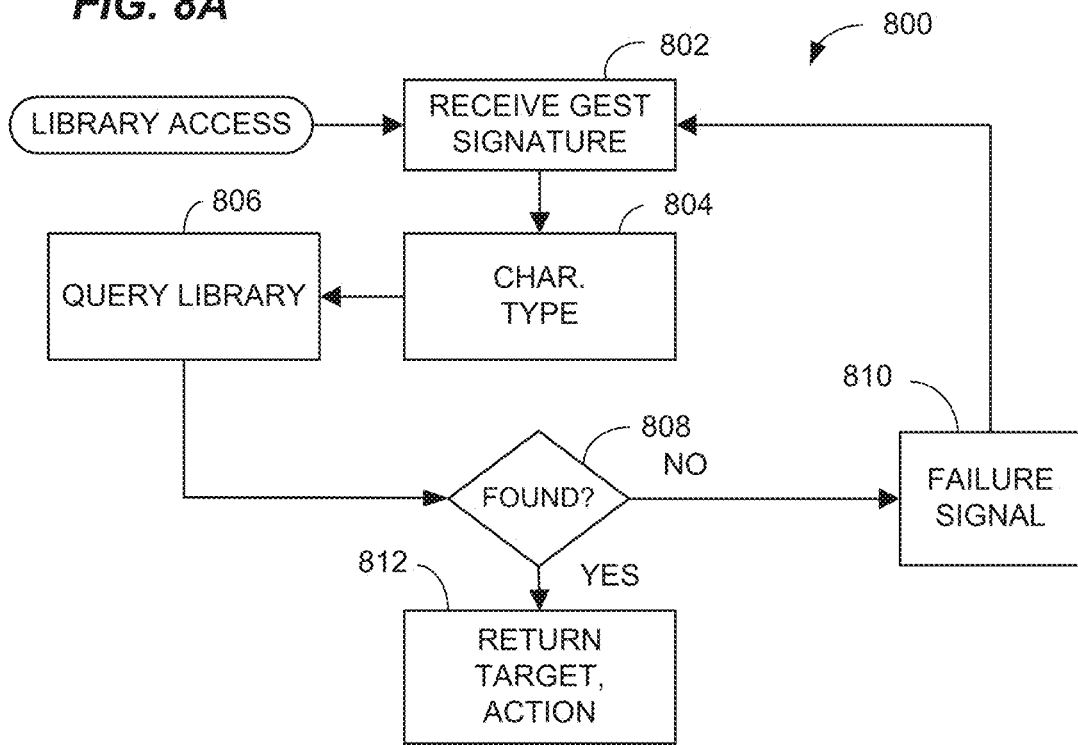
FIG. 8A-B are flow charts illustrating aspects of accessing a library of gesture-action associations and recognizing a gesture type.
Figure 8B:
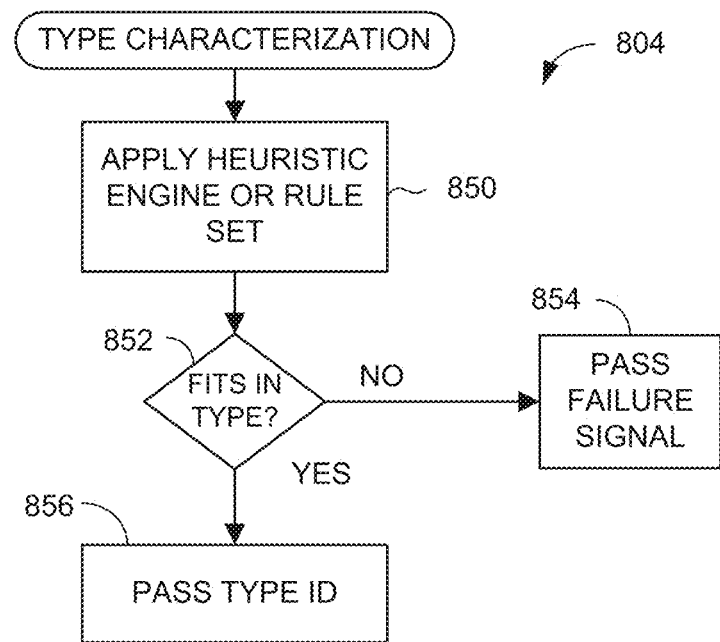

FIG. 8A-B show aspects of a method 800 for accessing a library of gesture-action associations and a related method 804 for recognizing a gesture type. At 802, a processor of a GR device or system receives a gesture signature. At 804, the processor classifies the character as a type, or as unclassifiable. At 806, the processor queries the user's gesture library by gesture type. If the gesture type is in the library at 808, the processor returns at 812 an identifier for a target client or clients and an identifier for at least one action associated with the gesture type, for use in controlling the targeted client or clients. If the gesture type does not exist in the library, or if the gesture is not classified, then the processor may provide a failure signal at 812.

FIG. 8B shows further details of gesture classification 804. At 850, the processor applies one or both of a heuristic or rules-based classification engine to the gesture signature. If using a heuristic algorithm, the processor may retrieve parameters for a heuristic engine trained on the user's gestures, populate the engine with the parameters, and process the signature using the populated engine. For a rules-based algorithm, the processor may select a class with the best fit across multiple measures of the movement (e.g., velocity, direction, acceleration, rotation, location) for each interval of time, and determine, for the best-fitting class, whether the fit satisfies a minimum threshold of similarity. At 852, if the signature fits within a type, the processor may pass the type identifier; otherwise, it may pass a failure signal at 854.

Figure 9:
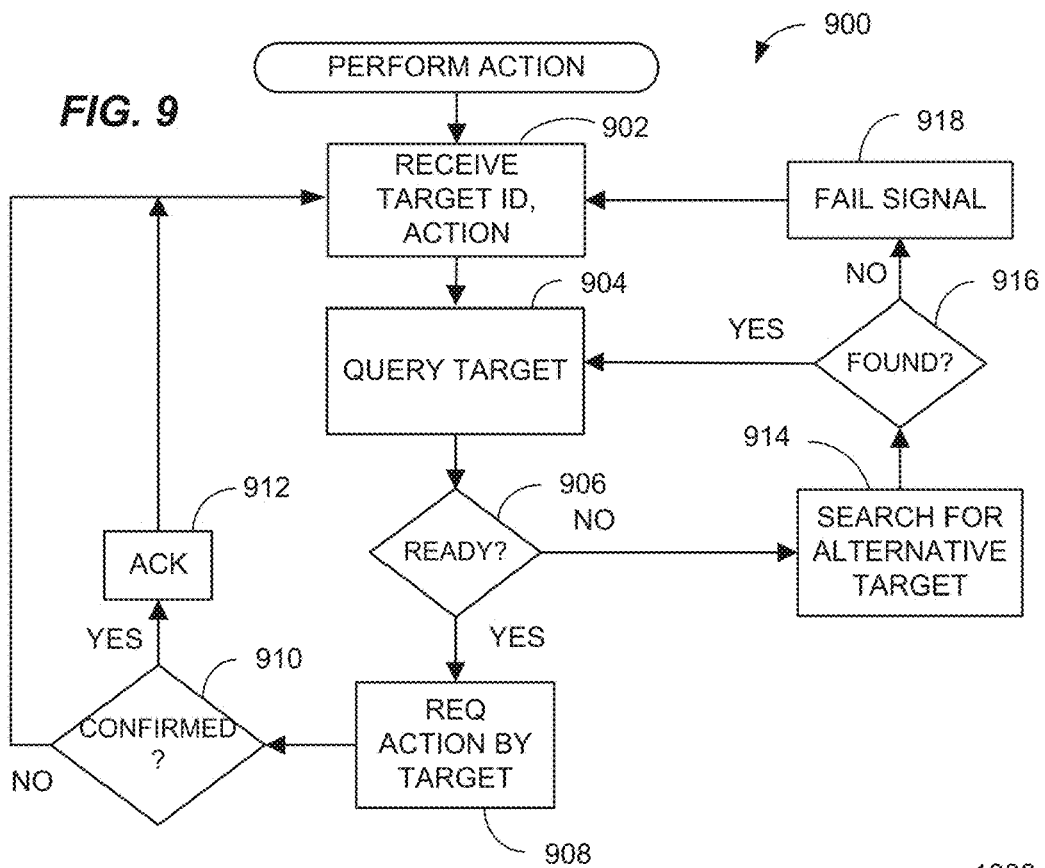
FIG. 9 is a flow chart illustrating aspects of performing an action specified by a gesture.

FIG. 9 shows aspects of a method 900 for performing an action specified by a gesture. At 902, the processor of a GR device or system may receive a target identifier and an action identifier. At 904, the processor queries the identified target using the action identifier, according to a query protocol for the target. At 906, the processor determines, based on a query response, whether the target is ready to perform the identified action. If the target is not ready, the processor may determine if an alternative or additional target is available at 914. If an additional or alternative target is available, the processor may revert to block 904, query target. If no other target is available, the processor may provide a fail signal at 918 and revert to 902 for the next requested action. If the target is ready at 906, the processor may request that the target perform the action at 908. At 910, the processor confirms that the action is performed, for example by receiving a signal from the target, or sensing a change in the environment caused by the action. If the performance is confirmed at 910, the GR device or system may provide an acknowledgement signal to the user, target, and/or administrative component of the GR system, and revert to block 902 for the next action. If the performance is not confirmed, the processor may revert directly to block 902.

Figure 10:
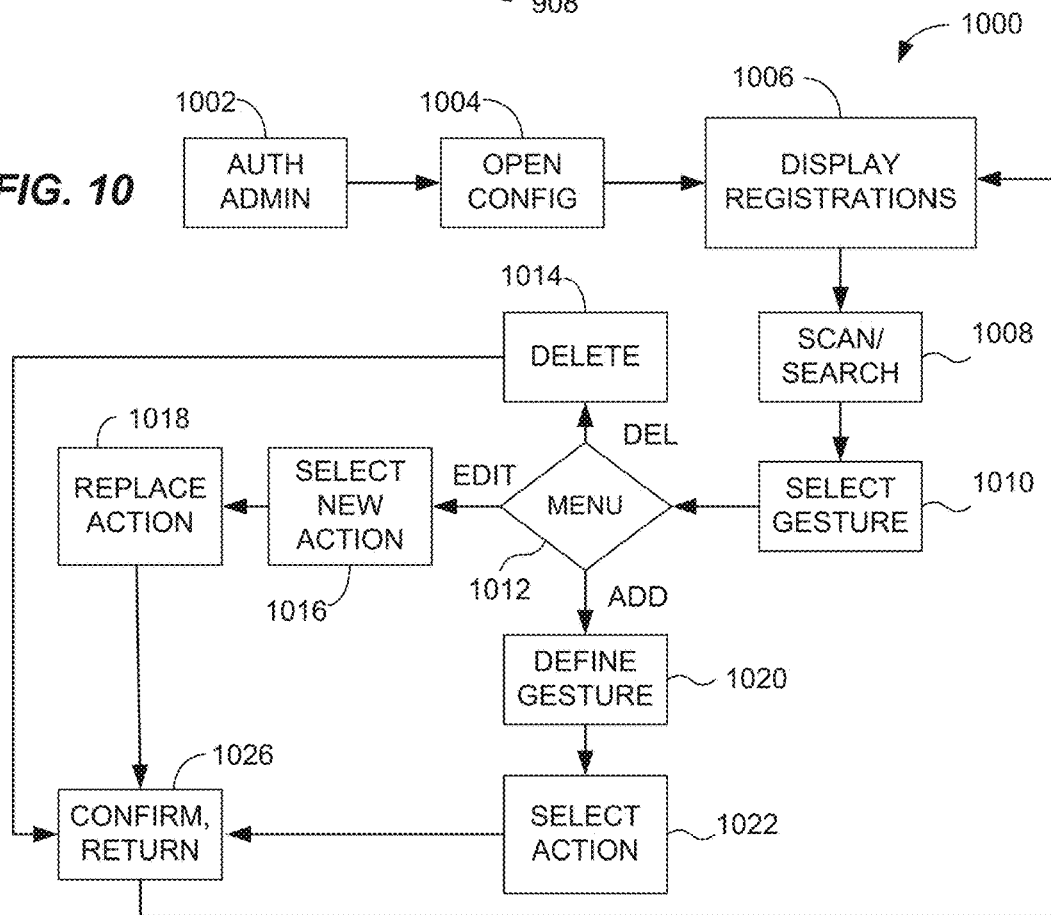
FIG. 10 is a flow chart illustrating a process for building or adding a personalized gesture library for use in or with a GR device.

FIG. 10 shows a process 1000 for building or adding a personalized gesture library for use in or with a GR device, such as may be performed by a administrative component of a GR system. At 1002, a processor of a GR device or system may authorize a user to edit a specified library of associations between action identifiers and gesture identifiers. At 1004, if the user passes authentication, the processor may access a configuration file specifying associations for the library. At 1006, the processor may output a display of current registrations, such as a list of gesture identifiers and associated action identifiers, using human-readable descriptions. At 1008, the processor may scan or search the configuration file to find a record requested by the user. At 1010, the processor may display a gesture returned by the search. In an alternative, the processor may omit the search 1008 and display 1010 if the user does not specify any gesture.

At 1012, the processor may present the user with a menu, including at least three possibilities: delete selected gesture, edit selected gesture, or add new gesture. If the user selects "delete," the processor may delete the gesture record at 1014, and at 1026, confirm the deletion and return to 1006 until user editing is finished.

If the user selects "edit," the processor may enable user selection of a new action and/or target, at 1016. For example, the processor may present an interface enabling user selection of a target from targets available to the user, and an action from available actions for each target. At 1018 in response to a user selection, the processor may replace the prior action and/or target in the configuration record with the newly selected action and/or target. Then the processor may confirm the change at 1026 and revert to the registration display until the user editing is finished.

If the user selects "add new action" at 1012, the processor may define a new gesture at 1020, for example, using the method 600 described in connection with FIG. 6. At 1022, the processor may enable user selection of any available action and/or target, for example as described in connection with block 1016. At 1026, the processor may confirm the change at 1026 and revert to 1006.

In accordance with an embodiment, as described above, the user may create corresponding gestures, which should not be construed to be limiting the scope of the disclosure. Notwithstanding, the disclosure may not be so limited, and in accordance with another embodiment, the gestures may be pre-programmed and stored within a gesture recognition system, that may execute within and/or in the background of an application of an external electronic device (such as a mobile device).

Figure 11:
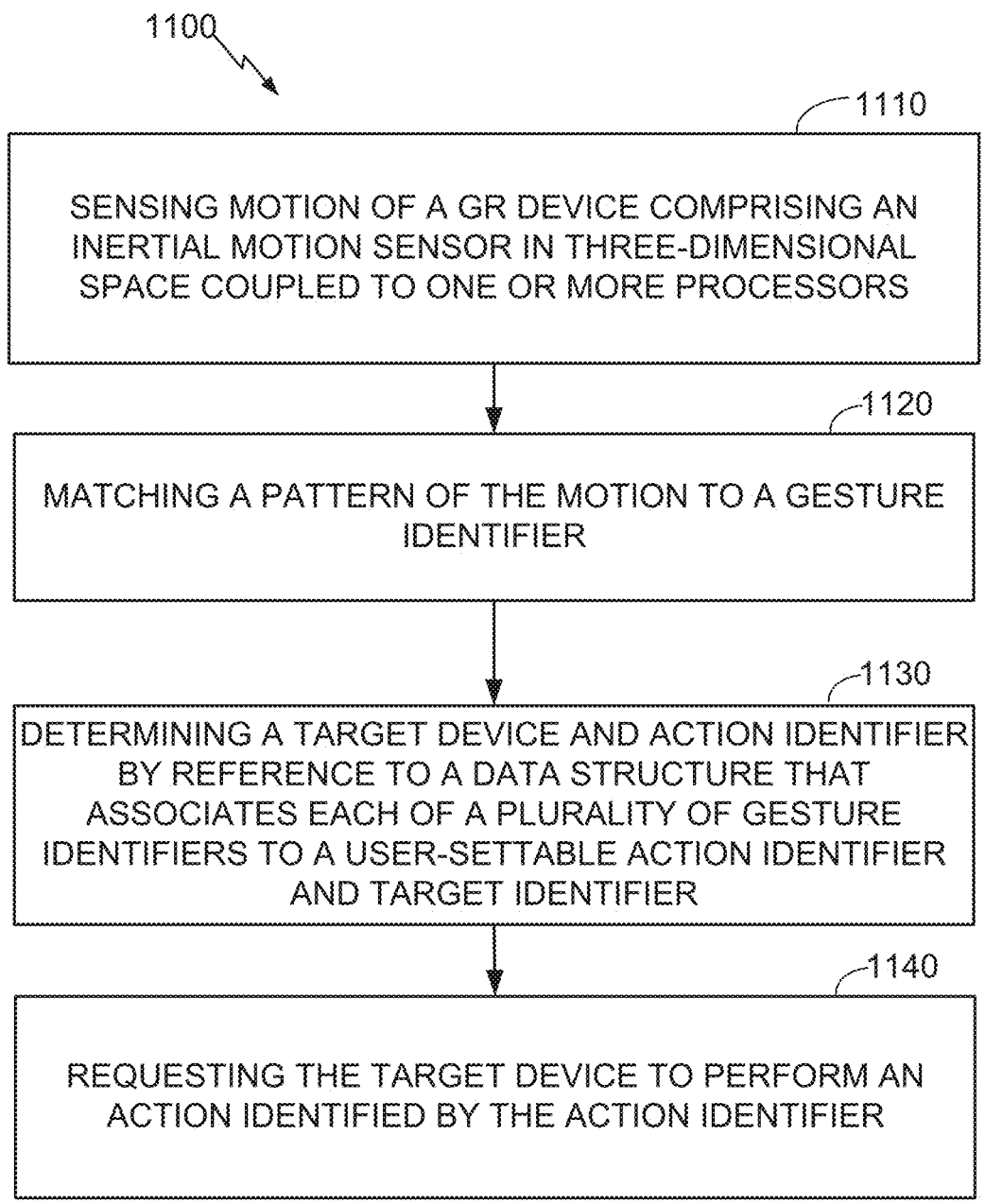
FIG. 11 is a flow chart illustrating a method for controlling a GR device to provide a gesture-centric user interface for controlling one or more connected devices.

FIG. 11 shows a method 1100 for controlling a GR device to provide a gesture-centric user interface for controlling one or more connected devices.

In accordance with the foregoing, and by way of additional example, FIG. 11 shows more general aspects of a method or methods 1100 according to one embodiment, as may be performed by one or more processors of a GR device or system as described herein. It should be appreciated that the more general operations of method 1100 may include or embody more detailed aspects of corresponding methods described herein above.

Referring to FIG. 11, a computer-implemented method 1100 for providing a gesture-centric user interface for multiple target devices may include, at 1110, sensing motion of a GR device comprising an inertial motion sensor in three-dimensional space coupled to one or more processors.

The method 1100 may further include, at 1120, matching a pattern of the motion to a gesture identifier. The method 1100 may further include, at 1130, determining a target device and action identifier by reference to a data structure that associates each of a plurality of gesture identifiers to a user-settable action identifier and target identifier. The method 1100 may further include, at 1140, requesting the target device to perform an action identified by the action identifier The method 1100 may include any one or more additional operations as described herein above. Each of these additional operations is not necessarily performed in every embodiment of the method, and the presence of any one of the operations does not necessarily require that any other of these additional operations also be performed. For example, optionally, method 1100 may further include a method 1000 of editing a library of gesture/action associations, or a method 600 for training a processor to recognize a gesture.

Figure 12C:
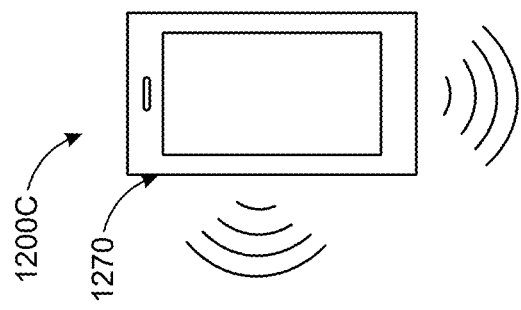
FIG. 12C is a diagram that illustrates an external device, in accordance with various embodiments of the disclosure.
Figure 12A:
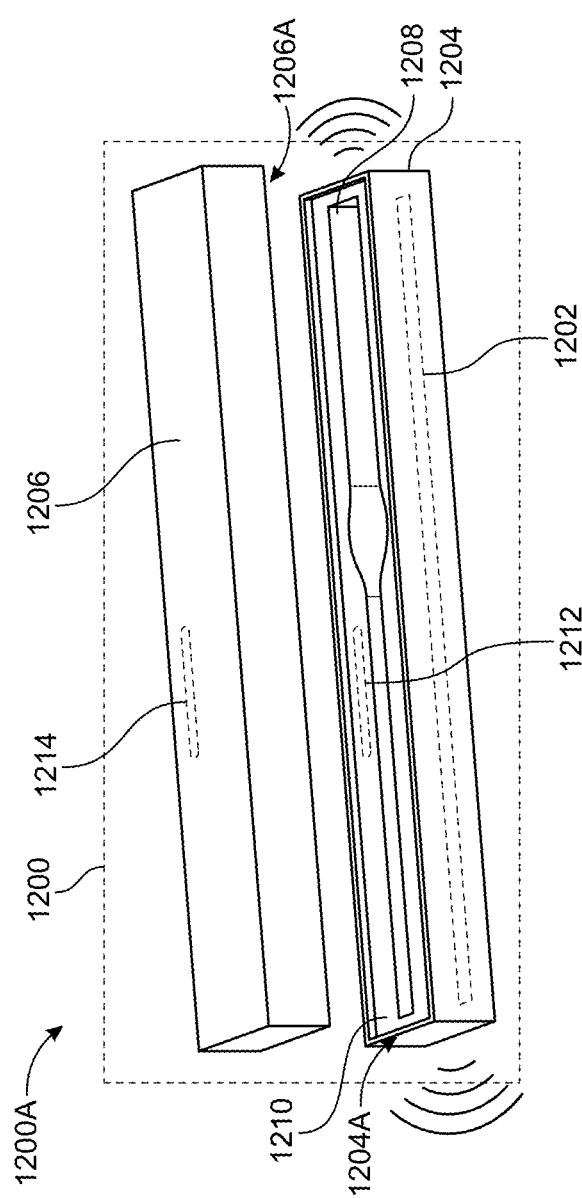
FIG. 12A is a diagram that illustrates an external view of an interactive casing, in accordance with various embodiments of the disclosure.

FIG. 12A is a diagram that illustrates an external view of an interactive casing 1200, in accordance with an embodiment of the disclosure. With reference to FIG. 12A, there is shown an external view 1200A of the interactive casing 1200 configured to secure a gesture recognition (GR) device, such as an exemplary GR device 1250 (as described in FIG. 12B) and manage states of the GR device 1250 and the interactive casing 1200. The interactive casing 1200 may include various electrical and electronic components, that are mounted on a first printed circuit board (PCB) 1202 secured within the body of the interactive casing 1200. Details of such electrical and electronic components are described in FIG. 13A.

With reference to FIG. 12A, the body of the interactive casing 1200 includes a base member 1204 and a lid member 1206. A top surface 1204A of the base member 1204 of the interactive casing 1200 comprises a longitudinal cavity 1208. A boundary line of the longitudinal cavity 1208 is based on contours of the GR device 1250. For example, if the contour of the GR device 1250 has curves or protrusions as a form of an outer shell design for aesthetics, the boundary line of the longitudinal cavity 1208 will have corresponding complementary receptacles to safely adjust the GR device 1250 when secured inside interactive casing 1200. The longitudinal cavity 1208 may be adapted to removably secure the GR device 1250.

A remaining portion of the top surface 1204A of the base member 1204 of the interactive casing 1200 may correspond to a flat portion 1210. Underneath the flat portion 1210 of the top surface 1204A, the base member 1204 may include a masked electrical switch 1212, for example a reed switch, and various electrical and electronic components, mounted on the PCB 1202. The masked electrical switch 1212 may be asserted or de-asserted when the lid member 1206 is engaged or disengaged from the base member 1204. The flat portion 1210 may be covered with a packing foam, for example, polyurethane, polyethylene, and expanded polystyrene (EPS), that ensures the safety of the GR device 1250 when moved from the one location to another, for example during mass shipping from factory to retail stores, from the retail stores to facility of the user 99 after purchase, or simply when the user 99 relocates the interactive casing 1200 from one place to another.

A bottom surface 1206A of the lid member 1206 may be configured to engage with the top surface 1204A of the base member 1204 of the interactive casing 1200. The bottom surface 1206A of the lid member 1206 may comprise a magnetic component 1214 that may induce a magnetic field. Detection of the magnetic field induced by the magnetic component 1214 may assert or de-assert the masked electrical switch 1212 when the lid member 1206 is engaged or disengaged from the base member 1204. It may be noted that for illustrative purposes, the shape of the interactive casing 1200 is shown to be cuboidal. Notwithstanding, the shape may vary based on the shape of the corresponding GR device 1250.

Regarding the material of the interactive casing 1200, the material may be such that it suitably protects the GR device 1250 from mechanical damage, cooling, radio frequency noise emission and electrostatic discharge, and at the same time, increases consumer appeal. Various non limiting examples may include paperboard, plastics (such as Polyethylene terephthalate, Polyvinyl chloride, and Polyethylene), moulded fiber, and the like.

Figure 12B:
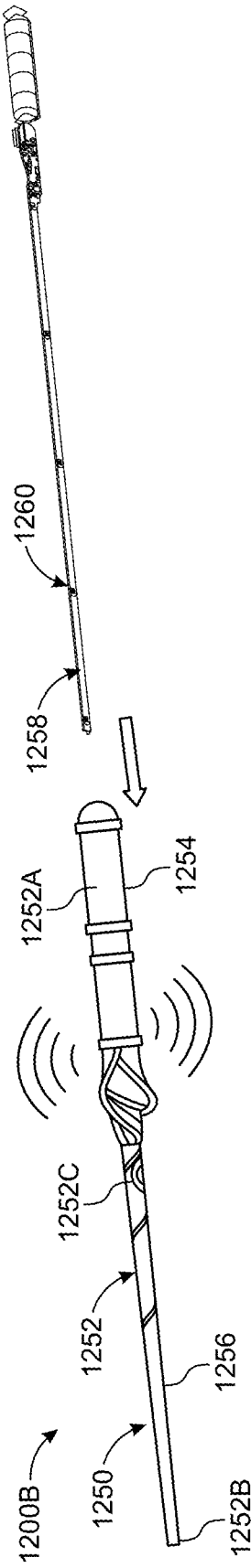
FIG. 12B is a diagram that illustrates an external view of a GR device, in accordance with various embodiments of the disclosure.

FIG. 12B is a diagram that illustrates an external view of an exemplary GR device 1250, in accordance with an embodiment of the disclosure. With reference to FIG. 12B, there is shown an external view 1200B of the GR device 1250, such as an interactive wand or a smart wand. The external view 1200B depicts an outer shell 1252 that comprises a handle 1254 and a shaft 1256. The outer shell 1252 includes various portions, such as an opaque portion 1252A, a transparent portion 1252B, and/or a translucent portion 1252C, that overall provides a classic, authentic, and dynamic appearance to the GR device 1250. The handle 1254 may be grasped by the hand of the user 99, while the shaft 1256 provides a form factor of a wand tip extending outward from the handle 1254. The outer shell 1252 may be configured and/or structured in such a manner that a single printed circuit board assembly (PCBA) 1258 may be easily slid into the outer shell 1252 and coupled thereto using a fastening mechanism, such as press-and-fit clip.

The opaque portion 1252A, that may comprise metal, wood, blended polymer or a combination thereof, and spans the majority of the outer shell 1252 of the GR device 1250 and masks the non-illuminating components of the second PCB 1258, and also adds to the aesthetic appeal of the GR device 1250. The transparent portion 1252B and the translucent portion 1252C provide an outer chassis to various illuminating components, such as plurality of light sources 1260, mounted on the second PCB 1258 when the GR device 1250 is in an active state.

The transparent portion 1252B may be positioned preferably at the tip of the GR device 1250 to provide a bright illumination when the GR device 1250 is in the active state. On the other hand, the translucent portion 1252C may be positioned above the handle 1254, at the bottom, and along the length of the shaft 1256 of the GR device 1250 to provide a diffused and subtle illumination when the GR device 1250 is in the active state.

The positions of the transparent portion 1201B and the translucent portion 1201C in the outer shell 1252 may correspond to the position of the plurality of light sources 1260 mounted on the second PCB 1258. The transparent portion 1252B and the translucent portion 1252C may illuminate in multi-colours, hues, and/or with varying intensity when the user 99 activates the GR device 1250 and subsequently provides gestures to perform a specific action, to facilitate interaction with smart devices at home, franchise locations, events, and/or bespoke enchanted items, thereby providing a spellcasting and magical experience to the user 99.

It should be noted that the form factor of the GR device 1250 in accordance with the external view 1200B is provided merely for exemplary purposes and should not be construed to limit the scope of the disclosure. Notwithstanding, other suitable form factors of the GR device 1250 may be contemplated for being held, moved through the air, worn and/or carried by movements of the extremities of the user 99. Each form factor of the GR device 1250 may define and prescribe a particular shape, size, pattern, material, and other physical specifications, without any deviation from the scope of the disclosure.

In accordance with an embodiment, the GR device 1250 may be a wireless interactive wand or a smart wand configured to communicate wirelessly via radio frequency (RF) or infrared (IR) communication mode with other devices by utilizing power generated by a corresponding power storage unit. In accordance with another embodiment, the GR device 1250 may be an interactive wand configured to illuminate at a plurality of sections by utilizing power generated by the corresponding power storage unit. In accordance with yet another embodiment, the GR device 1250 may be an interactive wand configured to generate haptic feedback by utilizing power generated by the corresponding power storage unit. For example, the GR device 1250 may light-up, vibrate and/or buzz at climactic movements while watching a movie or a show. In accordance with yet another embodiment, the GR device 1250 may communicate with an enchanted object, via an external electronic device 1270 (FIG. 12C), without use of a router. In certain embodiments, the external electronic device 1270 comprises a gesture recognition engine (not shown in FIG. 12C) for classifying the gestures by type and associating the action identifiers and gesture types. In other embodiments, the GR device 1250 may comprise the gesture recognition engine that may be executed by the GR device 1250 or via connection to the cloud.

FIG. 12C is a diagram that illustrates an external view of an exemplary external electronic device 1270, in accordance with an embodiment of the disclosure. With reference to FIG. 12C, there is shown an external view 1200C of the exemplary external electronic device 1270 that is registered with the user 99. A mobile application, also referred to as a mobile app or simply an app, may be required to be installed and executed at the exemplary external electronic device 1270, such as a mobile phone, a tablet, or a smart watch. Such mobile application may have a variety of features, such as real-time processing, low-complexity and robustness as well as the high-resolution tracking and accuracy.

In operation, initially, the GR device 1250 may be in a first device state, i.e., a ship mode state, to suppress the battery power consumption after manufacturing until delivery to the end user 99. At the same time, the interactive casing 1200 may also be in a first system state, i.e., the ship mode state, to suppress the battery power consumption after manufacturing until delivery to the end user 99. During the first system state and the first device state, power levels of a first power storage device of the interactive casing 1200 and a second power storage device of the GR device 1250 are maintained.

During usage, to open the interactive casing 1200, the user 99 disengages the lid member 1206 from the base member 1204 of the interactive casing 1200. Accordingly, the removal of the magnetic field induced by the magnetic component 1214 may de-assert the masked electrical switch 1212. Based on the detection of the de-assertion, the masked electrical switch 1212 may be activated and a first signal is generated. A processor, which may correspond to a controller device, a central processing unit (CPU), a micro controller unit (MCU), a power management device (PMD) or an integration thereof, in the interactive casing 1200 converts the first system state to a second system state upon the receipt of the first signal. The processor may further generate an audio-visual feedback to provide first-time user experience based on the conversion to the second system state from the first system state. In certain cases, a false trigger may be generated by external factors, for example a strong external electric or magnetic field, which may de-assert the masked electrical switch 1212 and trigger the interactive casing 1200 to convert to the second system state. In such embodiment, the processor in the interactive casing 1200 may monitor for a pre-defined time, such as 5 mins, whether it was a transient field and the GR device 1250 is still secured within the interactive casing 1200. If so, the processor in the interactive casing 1200 may interpret such a de-assertion as a false trigger and convert back to the first system state.

In accordance with an embodiment, the processor in the interactive casing 1200 may communicate a second signal to the GR device 1250 based on the conversion to the second system state from the first system state of the interactive casing 1200. Based on the received second signal, the first device state of the GR device 1250 may be converted to a second device state. The second system state and the second device state may correspond to a wake state. When the interactive casing 1200 is in the second system state, a first system power-on sequence may be enabled. Similarly, when the GR device 1250 is in the second device state, a second system power-on sequence may be enabled.

In accordance with an embodiment, the state cycle of the interactive casing 1200 may be terminated based on a detection of an established first communication channel between the interactive casing 1200 and the external electronic device 1270 when the interactive casing 1200 is in the second system state, and/or another establishment of a second communication channel between the GR device 1250 and the external electronic device 1270 when the GR device 1250 is in the second device state. The termination of the state cycle prevents the back conversion from the second system state to the first system state.

In accordance with another embodiment, the second system state may be converted to the first system state based on a detection of an unestablished first communication channel between the interactive casing 1200 and the external electronic device 1270 and/or another unestablished second communication channel between the GR device 1250 and the external electronic device 1270 over a pre-defined time period. Further, the second system state may be converted to the first system state based on a detection of a zero first movement of the GR device 1250 and/or a zero second movement of a user handling the GR device 1250 over a pre-defined time period. Furthermore, the second system state may be converted to the first system state based on an assertion of the masked electrical switch 1212 in the interactive casing 1200 via a presence of a magnetic-field induced by the magnetic component 1214 in the lid member 1206 over a pre-defined time period.

In accordance with another embodiment, the first communication channel between the interactive casing 1200 and the external electronic device 1270, and the second communication channel between the GR device 1250 and the external electronic device 1270, may be established based on a pre-defined communication mode, such as Wi-Fi, Bluetooth® or Bluetooth low energy (BLE), or other such short-range communication mode. In an exemplary scenario, when the communication mode is Wi-Fi, each of the devices (i.e. the interactive casing 1200, the GR device 1250, and the external electronic device 1270) includes Wi-Fi module that may include a Wi-Fi radio, Wi-Fi antenna, circuitry and software and/or firmware required for Wi-Fi communication. In another exemplary scenario, when the communication mode is BT/BLE, each of such devices includes a BT/BLE radio, BT/BLE antenna, circuitry and software and/or firmware required for BT/BLE communication.

Figure 13A:
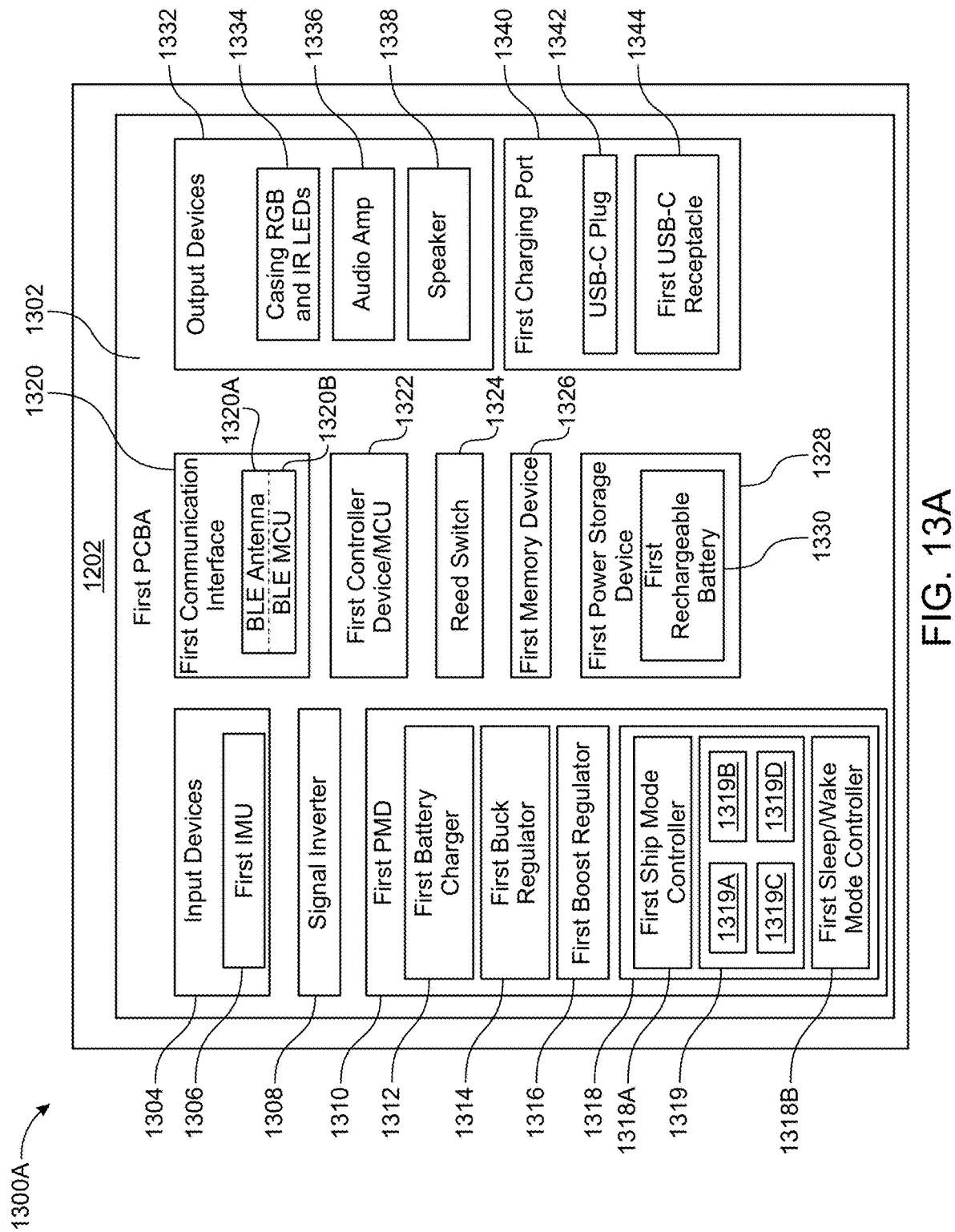
FIG. 13A is a component diagram that illustrates a first schematic view of an interactive casing, in accordance with various embodiments of the disclosure.

FIG. 13A is a component diagram that illustrates a first schematic view 1300A of the interactive casing 1200, in accordance with various embodiments of the disclosure.

The first schematic view 1300A of the interactive casing 1200 includes a first PCBA 1302 on which various electrical components are mounted. Such electrical components may include input devices 1304 (such as a reed switch 1324), a signal inverter 1308, and a first PMD 1310. The first PMD 1310 may further include a first battery charger 1312, a first buck regulator 1314, a first boost regulator 1316, and a first ship mode controller 1318A. The electrical components may further include a first communication interface 1320, a first controller device/MCU 1322, a first IMU 1306, a first memory device 1326, and a first power storage device 1328 that includes a non-removable first rechargeable battery 1330. The electrical components may further include output devices 1332 that further includes casing RGB and IR LEDs 1334, an audio amp 1336, and a speaker 1338. The electrical components may further include a first charging port 1340 that further includes as a USB-C plug 1342 and a first USB receptacle 1344.

The input devices 1304 may correspond to the devices that are configured to generate a signal when the user 99 asserts such devices. The assertion may be in form of touch input, 3D motion data, a gesture input, and the like. The input devices 1304 may include various sensors and devices, such as capacitive/resistive touch pads, pressure sensing pads, physical buttons, an altimeter or the first IMU 1306. The first IMU 1306 may comprise suitable logic, circuitry, and interfaces that may be configured to determine the position, velocity, and posture of a body, such as the interactive casing 1200, with respect to a reference coordinate system and generates a measurement value. The first IMU 1306 may include accelerometers and gyro sensors, and may include magnetometers separately to minimize errors.

The signal inverter 1308 may comprise suitable logic, circuitry, and interfaces that may be configured to provide reset signals to different power management integrated circuits (ICs), such as the first PMD 1310, based on corresponding ship modes and/or operational characteristics, such as rising edge triggered IC or falling edge triggered IC. The signal inverter 1308 may also be configured to provide reset signals to the reed switch 1324 based on whether the reed switch 1324 is normally open or normally closed.

The first PMD 1310 may comprise suitable logic, circuitry, and interfaces that may be configured to provide the power rails of the interactive casing 1200. When the interactive casing 1200 is in the ship mode, all the power rails are essentially off, but the first PMD 1310 draws just enough current to monitor the trigger line to exit out of the ship mode. The first PMD 1310 of the interactive casing 1200 may control an ultra-deep sleep state (also referred to as, ultra-low power state) of the interactive casing 1200. The ultra-deep sleep state may correspond to a ship mode state that is the lowest quiescent current state of the non-removable first rechargeable battery 1330, according to which less that 1 microamp, for example 500 nanoamps of current is drawn. Thus, the battery power consumption is suppressed, thereby prolonging the battery life after the manufacturing until delivery to an end user, i.e. the user 99, and allowing the interactive casing 1200 to stay on-the-shelf for many years even though the first PMD 1310 continues monitoring the trigger line.

The first battery charger 1312 may comprise suitable logic, circuitry, and interfaces that may be configured to operate as a direct current (DC) charger. The power may be supplied via an external power supply that converts alternating current (AC) outlet power to DC cable power. The DC cable power cable provided DC power to the first battery charger 1312 to charge the first rechargeable battery 1330 inside the battery pack, i.e., the first power storage device 1328.

The first buck regulator 1314 may correspond to a switched-mode power supply (SMPS) device that may comprise suitable logic, circuitry, and interfaces that may be configured to step-down the input voltage (supply) provided by the first power storage device 1328 to output voltage (load) required by, for example the first controller device/MCU 1322. The first buck regulator 1314 powers on the first controller device/MCU 1322 that works on a lower voltage, such as 3.0 V, that is regulated by the first buck regulator 1314.

The first boost regulator 1316 may correspond to an SMPS device that may comprise suitable logic, circuitry, and interfaces that may be configured to step-up the input voltage (supply) provided by the first power storage device 1328 to output voltage (load) required by, for example the VBUS of the USB, which may provide 5.0 V up to 500 mA of current. It should be noted that the above exemplary value of 500 mA of current should not be construed to be limiting. The value of the current may be higher based on more advanced and/or more economical battery technology and SMPS device, without deviation from the scope of the disclosure. The voltage of 5.0 V powers on the VBUS and the signal that comes through is on-the-go (OTG) power that allows the interactive casing 1200 to act as a host, allowing other USB devices, such as the GR device 1250, to be attached to the interactive casing 1200. The voltage of 5.0 V goes through the VBUS of the USB that may act as a trigger (i.e. the second signal) to the second PMD 1360 of the GR device 1250 to be converted to the second device state from the first device state (i.e. the ship mode).

The first ship mode controller 1318A may comprise suitable logic, circuitry, and interfaces that may be configured to optionally invert a first set of transistors to minimize a first current leakage from the first power storage device 1328 when the interactive casing 1200 is in the first system state. The first sleep/wake mode controller 1318B may comprise suitable logic, circuitry, and interfaces that may be configured to optionally invert the first set of transistors 1319D to enable current flow from the first power storage device 1328 when the interactive casing 1200 is converted to the second system state. In an exemplary embodiment, the first ship mode controller 1318A may be coupled to first set of components 1319, such as an amplifier 1319A, a comparator 1319B, a low-dropout regulator 1319C, and a first set of transistors 1319D. In the first system state, the first PMD 1310 may disable the low-dropout regulator 1319C and the bus engine. Accordingly, the first ship mode controller 1318A may turn off all the electronic components in the interactive casing 1200 to achieve the ultra-deep sleep state by turning off the first set of transistors 1319D. This results in a minimized first current leakage from the first power storage device 1328 when the interactive casing 1200 is in the first system state. In the second system state, the first PMD 1310 may enable the low-dropout regulator 1319C and the bus engine, and the first sleep/wake mode controller 1318B enables the first time system boot/wake-up sequence by turning on the first set of transistors 1319D.

The first communication interface 1320 may comprise suitable logic, circuitry, and interfaces that may be configured to enable the interactive casing 1200 to establish a communication channel between the interactive casing 1200 other devices, such as the external electronic device 1270 and the GR device 1250. The first communication interface 1320 may support wireless communication technologies, such as Wi-Fi, BT, BLE, Cellular (LTE/5G), or the like.

The first communication interface 1320 may be realized using an antenna for use in wireless communications, such as multi-input multi-output (MIMO) communications, BT, and the like. The antenna may include, but is not limited to directional antennas, omnidirectional antennas, monopoles, patch antennas, loop antennas, microstrip antennas, dipoles, and any other antenna(s) suitable for communication transmission/reception. The antenna generally interacts with an Analog Front End (AFE), which may provide correct processing of the received modulated signal and signal conditioning for a transmitted signal. The AFE may be functionally located between the antenna and a digital baseband system in order to convert the analog signal into a digital signal for processing and vice-versa. For exemplary purposes, as illustrated in FIG. 13A, the antenna may be a BLE antenna 1320A that may be connected to a wireless communication interface capable of supporting paired interaction, for example a BLE control circuit, such as the BLE MCU 1320B, as illustrated in FIG. 13A.

The first communication interface 1320 may be further realized using wireless radio (that may include a Wi-Fi/BT/BLE module, and a transceiver which can transmit and receive signals, to and from other wireless devices or access points using the antennas.

Non limiting examples of wireless protocols that may include Wi-Fi (e.g. IEEE 802.11a/b/g/n, WiMax, Wireless HD, WiGig, WiGi), BT/BLE, infrared, LTE, 4G, 5G, 3GPP, and the like, through BLE interface, Wi-Fi interface, near-field communication (NFC) interface, cellular technology interface, and other interface(s).

The first controller device/MCU 1322 may comprise suitable logic, circuitry, and interfaces that may be configured to control one or more circuits or devices mounted on the first PCBA 1302. The first controller device/MCU 1322 may correspond to a first processor, a CPU or an MCU that has no power rail when the first PMD 1310 is in the ship mode state. When the first signal is received by the first PMD 1310, the first PMD 1310 turns on the power rails, the first controller device/MCU 1322 is powered on for the first time, and thus, the interactive casing 1200 is turned on. The first controller device/MCU 1322 may be further configured to manage internal/external memory devices and the first communication interface 1320.

The first controller device/MCU 1322 may comprise a general purpose programmable processor or controller for executing application programming or instructions related to the interactive casing 1200. Furthermore, the first controller device/MCU 1322 may perform operations for configuring and transmitting information as described herein. The first controller device/MCU 1322 may include multiple processor cores, and/or implement multiple virtual processors. Optionally, the first controller device/MCU 1322 may include multiple physical processors. By way of example, the first controller device/MCU 1322 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The reed switch 1324 may correspond to the masked electrical switch 1212, as illustrated in FIG. 13A. The reed switch 1324 may be a normally open reed switch masked underneath the top surface 1204A of the base member 1204. When the lid member 1206, which comprises the magnetic component 1214, is engaged with the base member 1204, or in other words, the interactive casing 1200 is closed, the reed switch 1324 and the magnetic component 1214 are relatively close that pushes together the contacts inside the reed switch 1324. However, when the lid member 1206 is disengaged from the base member 1204, or in other words, the interactive casing 1200 is opened, the reed switch 1324 and the magnetic component 1214 become relatively far apart that push apart the contacts on the reed switch 1324. The first controller device/MCU 1322 may be configured to sense the state of the reed switch 1324 and generate a first signal. The first controller device/MCU 1322 may be configured to communicate the generated first signal to the first PMD 1310.

The first memory device 1326 may store information and operations necessary for configuring and transmitting/receiving the signals described herein. The first memory device 1326 may also be used in connection with the execution of application programming or instructions by the first controller device/MCU 1322, and for temporary or long term storage of program instructions and/or data. As examples, the first memory device 1326 may comprise a computer-readable device, random access memory (RAM), read only memory (ROM), dynamic RAM (DRAM), synchronous DRAM (SDRAM), and/or other storage device(s) and media.

The first power storage device 1328 may include the first rechargeable battery 1330 to store power or electric charge from the power received from the first boost regulator 1316. The first rechargeable battery 1330 may be of different types, including but not limited to, lithium-ion, lithium-polymer, and nickel-metal hydride (NiHM), among others. The first rechargeable battery 1330 may exhibit shapes and dimensions suitable for fitting in the interactive casing 1200, while charging capacity and cell design of the first rechargeable battery 1330 may depend on load requirements. For example, for charging or powering the interactive casing 1200, the first rechargeable battery 1330 may deliver a voltage from about 3 volts to about 4.2 volts.

The output devices 1332 may include the casing RGB and IR LEDs 1334, the audio amp 1336, and the speaker 1338 that may generate audio and/or visual feedback for the user 99 to provide first-time user experience based on the conversion to the second system state from the first system state. The casing RGB and IR LEDs 1334 may be configured to illuminate in different animated colors to provide a visual feedback to the user 99 when the interactive casing 1200 converts to a wake state from the ultra-deep sleep state, i.e. the ship mode state. The speaker 1338 may correspond to an audio transducer that generates for audio feedback to the user 99 and may be configured to render a sound effect when the interactive casing 1200 converts to a wake state from the ultra-deep sleep state, i.e. the ship mode state.

The first charging port 1340 that includes the USB-C plug 1342 and the first USB receptacle 1344 may correspond to Universal Serial Bus (USB) hardware. The USB is an industry standard that establishes specifications for cables, connectors and protocols for connection, communication and power supply (interfacing) between various devices, such as the interactive casing 1200 and the GR device 1250. The first charging port 1340 may be configured to supply currents between 500 mA and 1.5 A without digital negotiation. The first charging port 1340 supplies up to 500 mA at 5.0 V, up to the rated current at 3.6 V or more, and drops its output voltage if the interactive casing 1200 attempts to draw more than the rated current. The first charging port 1340 may be of two types: the charging downstream port (CDP), supporting data transfers as well, and the dedicated charging port (DCP), without data support. The USB-C plug 1342 may define a new small male reversible-plug connector for USB devices. The USB-C plug 1342 connects to both hosts and devices, replacing various Type-A and Type-B connectors and cables with a future-proof standard. The first USB receptacle 1344 may be the female connector mounted on the host or device, and the male connector attached to the cable is referred to as the USB-C plug 1342. It may be noted that the above example should not be construed to be limiting, and other types of charging ports, such as Pogo pin, Wireless charging, inductive charging, and barrel jack, may also be implemented without any deviation from the scope of the disclosure.

Figure 13B:
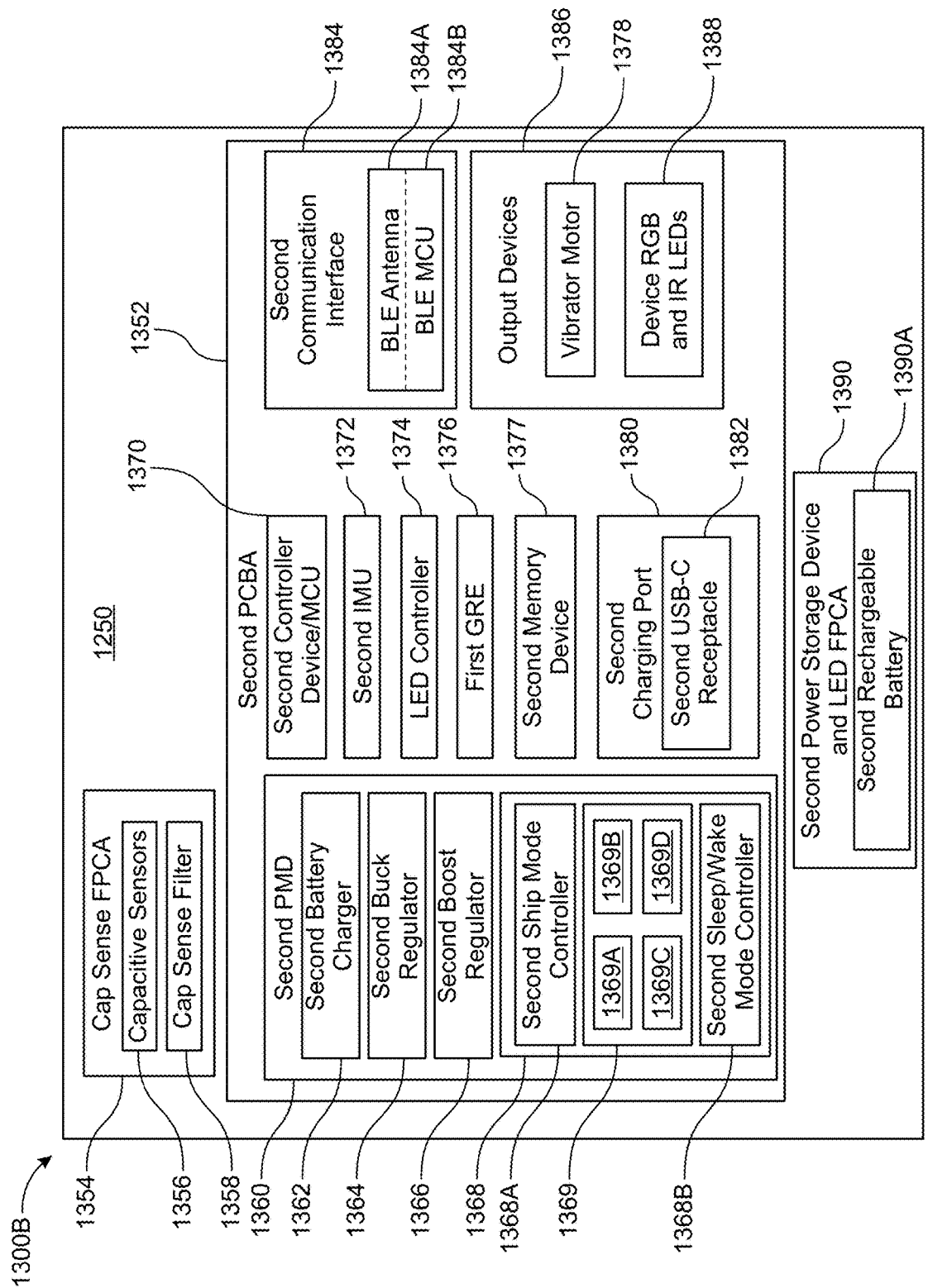
FIG. 13B is a component diagram that illustrates a second schematic view of a GR device, in accordance with various embodiments of the disclosure.

FIG. 13B is another component diagram that illustrates a second schematic view 1300B of the GR device 1250, in accordance with various embodiments of the disclosure.

The second schematic view 1300B of the GR device 1250 includes a second PCBA 1352 on which various electrical components are mounted. The second schematic view 1300B further includes a cap sense flex printed circuit assembly (FPCA) 1354 that is coupled to capacitive sensors 1356 and cap sense filters 1358. The second PCBA 1352 may include a second PMD 1360 that further includes a second battery charger 1362, a second buck regulator 1364, a second boost regulator 1366, and a second ship mode controller 1368A. The second PCBA 1352 may further include a second controller device/MCU 1370, a second IMU 1372, an LED controller 1374, a first gesture recognition engine (GRE) 1376, a second memory device 1377, a vibrator motor 1378, a second charging port 1380 (that includes a second USB-C receptacle 1382), a second communication interface 1384, and output devices 1386 (that includes RGB and IR LEDs 1388). The second schematic view 1300B of the GR device 1250 further includes a second power storage device and LED FPCA 1390 that includes a second non-removable rechargeable battery 1390A.

The cap sense FPCA 1354 may be a flex printed board upon which the capacitive sensors 1356 and the cap sense filters 1358 may be mounted. The capacitive sensors 1356 may be configured to sense a multi-touch assertion provided by the user 99 on handle of the GR device 1250. The cap sense filters 1358 may be configured to filter out unwanted noise from the assertion signals generated by the capacitive sensors 1356. The capacitive sensors 1356 and the cap sense filters 1358 may act as input devices and communicate the assertion signals to the second controller device/MCU 1370 for further processing, such as triggering the LED controller 1374 for multi-color illumination generated by the RGB LEDs from the RGB and IR LEDs 1388.

The second PMD 1360 may comprise suitable logic, circuitry, and interfaces that may be configured to receive the power signal of 5V (as the second signal) as a trigger at the USB line of the GR device 1250 via the VBUS of the USB of the interactive casing 1200. At this point in time, the GR device 1250 is already in the first device state, i.e. the ship mode. Upon the receipt of the second signal, the second PMD 1360 may be configured to wake up the GR device 1250, i.e. convert to the second device state from the first device state of the GR device 1250.

The second battery charger 1362 may correspond to a DC internal battery charger that may be configured to supply power to the second rechargeable battery 1390A. In accordance with an exemplary embodiment, a separate wall charger may be configured to perform the AC (corresponding to the external power supply) to DC conversion. An external DC power supply cable may provide DC power (5.0V) to the interactive casing 1200. When the GR device 1250 is secured inside and connected to the interactive casing 1200, based on the state of the interactive casing 1200, the DC power (5.0V) may be supplied by the first boost regulator 1316, i.e., the step-up SMPS device, to the GR device 1250 through the USB coupling of the first charging port 1340 (i.e. the USB-C plug 1342) with the second charging port 1380 (i.e. the second USB-C receptacle 1382).

The second buck regulator 1364 may comprise suitable logic, circuitry, and interfaces that may be configured to step-down the input voltage (supply) provided by the second power storage device and LED FPCA 1390 to output voltage (load) required by, for example the second controller device/MCU 1370. The second buck regulator 1364 powers on the second controller device/MCU 1370 that works on a lower voltage, such as 3.0V, that is regulated by the second buck regulator 1364

The second boost regulator 1366 may correspond to an SMPS device that may comprise suitable logic, circuitry, and/or interfaces that may be configured to step-up the input voltage (supply) provided by the second power storage device and LED FPCA 1390 to output voltage (load) required by, for example the VBUS of the USB, which may be, for example 5.0V.

The second ship mode controller 1368A may comprise suitable logic, circuitry, and interfaces that may be configured to optionally invert a second set of transistors to minimize a second current leakage from the second power storage device and LED FPCA 1390 when the GR device 1250 is in the first device state. In an exemplary embodiment, the second ship mode controller 1368A may be coupled to a second set of components 1369, such as another amplifier 1369A, another comparator 1369B, another low-dropout regulator 1369C, and a second set of transistors 1369D. In the first system state, the second PMD 1360 may disable the other low-dropout regulator 1369C and a bus engine. Accordingly, the second ship mode controller 1368A may turn off all the electronic components in the GR device 1250 to achieve the ultra-deep sleep state by turning off the second set of transistors 1369D. This results in a minimized second current leakage from the second power storage device and LED FPCA 1390 when the GR device 1250 is in the first device state.

The second sleep/wake mode controller 1368B may comprise suitable logic, circuitry, and interfaces that may be configured to enable the first time system boot/wake-up sequence by turning on the second set of transistors 1369D when the second PMD 1360 enables the other low-dropout regulator 1369C and the bus engine during the second device state. In accordance with an embodiment, the power output (or the power line signal) of the first boost regulator 1316, i.e., the 5V SMPS device, of the interactive casing 1200 is OFF when the interactive casing 1200 is in the first system state. As the interactive casing 1200 wakes (i.e. the interactive casing 1200 is in the second system state), the power output (or the power line signal) of the first boost regulator 1316, i.e. the 5V SMPS device, is turned ON. In such case, the GR device 1250 wakes up and converts to second device state as it receives the 5V power output from the interactive casing 1200 through the USB coupling of the first charging port 1340 (i.e. the USB-C plug 1342) with the second charging port 1380 (i.e. the second USB-C receptacle 1382).

The second controller device/MCU 1370 may comprise suitable logic, circuitry, and interfaces that may be configured to control one or more circuits or devices mounted on the second PCBA 1352. The second controller device/MCU 1370 may correspond to a second processor, a CPU or an MCU that has no power rail when the second PMD 1360 is in the ship mode state. When the second signal is received by the second PMD 1360, the second PMD 1360 turns on the power rails, the second controller device/MCU 1370 is powered on for the first time, and thus, the GR device 1250 is turned on. The second controller device/MCU 1370 may be further configured to manage internal/external memory devices and the second communication interface 1384.

The second controller device/MCU 1370 may comprise a general purpose programmable processor or controller for executing application programming or instructions related to the GR device 1250. Furthermore, the second controller device/MCU 1370 may perform operations for configuring and transmitting information as described herein. The second controller device/MCU 1370 may include multiple processor cores, and/or implement multiple virtual processors. Optionally, the second controller device/MCU 1370 may include multiple physical processors. By way of example, the second controller device/MCU 1370 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The second IMU 1372 may comprise suitable logic, circuitry, and interfaces that may be configured to determine the position, velocity, and posture of a body, such as the GR device 1250, with respect to a reference coordinate system and generates a measurement value. The second IMU 1372 may include accelerometers and gyro sensors, and may include magnetometers separately to minimize errors.

The second IMU 1372 may determine from sensor data magnitude and direction of motion of the GR device 1250 in up to three spatial axes, three rotational axes, and three geospatial orientation axes, or other useful metric for determining pattern of movement and the associated gestures, using any desired coordinate system (e.g., Cartesian or spherical) and any useful sampling interval, such as for example, 0.1 to 100 milliseconds. The second IMU 1372 may output other useful information, for example, its geospatial orientation associated with the GR device 1250.

The LED controller 1374 may comprise suitable logic, circuitry, and interfaces that may be configured to alter the power on each of the three channels (red, green and blue) of the RGB LEDs from the RGB and IR LEDs 1388 to create a specific colour mix. For example, to generate a purple colour, the LED controller 1374 may wound up red and blue channels, and turn off the green channel completely. The LED controller 1374 may be further configured to change and select color temperatures, with color temperature changing Correlated Color Temperature (CCT) LEDs and dim single-color, white LEDs to varying light levels. The LED controller 1374 may be further configured to control the color-changing modes, such as strobe, fading, and flash, as well as color-changing order and speed.

The first GRE 1376 may comprise suitable logic, circuitry, and interfaces that may be configured to classify gestures by type and associate the action identifiers and gesture types performed by the user 99 using the GR device 1250, while characterizing a movement pattern of the GR device 1250 as digital data. Likewise, the GR device 1250 may connect with one or more remote servers 422, that may provide resources for gesture recognition, for example, library data, or code execution for gesture recognition or gesture recognition training. For example, the remote server 422 may classify gestures by type and associate the action identifiers and gesture types, while characterizing a movement pattern as digital data is done by the second controller device/MCU 1370 of the GR device 1250. In an embodiment, the first GRE 1376 in the GR device 1250 may initiate the first step in a gesture recognition process: converting a gesture into a wireless, machine-readable signal that can be characterized by type without performing later operations in a chain of causation between a gesture by the user 99 and an action by a target device. In another embodiment, the first GRE 1376 in the GR device 1250 may perform later operations in the chain of causation. In yet another embodiment, in case of absence of the first GRE 1376 in the GR device 1250, the second GRE 1397 in the external electronic device 1270 may be configured to perform the task of gesture recognition for the GR device 1250. In yet another embodiment, a GRE may be hosted by the cloud computing service that corresponds to an on-demand availability of system resources, especially data storage and computing power, without direct active management by the user.

The second memory device 1377 may store information and operations necessary for configuring and transmitting/receiving the signals described herein. The second memory device 1377 may also be used in connection with the execution of application programming or instructions by the second controller device/MCU 1370, and for temporary or long term storage of program instructions and/or data. As examples, the second memory device 1377 may comprise a computer-readable device, RAM, ROM, DRAM, SDRAM, and/or other storage device(s) and media.

The vibrator motor 1378 may be a compact size coreless DC motor that may provide haptic feedback to the user 99 of receiving an output signal by vibrating without any sound. The vibrator motor 1378 may include a magnet coreless DC motor that is permanent, i.e., it permanently retains its magnetic properties unlike electromagnets. The vibrator motor 1378 is light weight with low noise and the power consumption. The vibrator motor 1378 may be configured as a coin (or flat) type vibration motor or a cylinder (or bar) type vibration motor. The vibrator motor 1378 may be controlled and managed by the second controller device/MCU 1370.

The second charging port 1380 may include the second USB-C receptacle 1382. The second charging port 1380 may be configured to receive currents between 500 mA and 1.5 A at 5V without digital negotiation. The second USB-C receptacle 1382 may be the female connector mounted on the GR device 1250. In accordance with various embodiments, the USB-C receptacle 1382 may feature 2-4 power, 2-4 ground and 2 configuration channel (cc) lines. It may be noted that the above example should not be construed to be limiting, and other types of charging ports, such as Pogo pin, Wireless charging, inductive charging, and barrel jack, may also be implemented without any deviation from the scope of the disclosure.

The second communication interface 1384 may comprise suitable logic, circuitry, and interfaces that may be configured to enable the GR device 1250 to establish a communication channel between the GR device 1250 and other devices, such as the external electronic device 1270 and the interactive casing 1200. The second communication interface 1384 may support wireless communication technologies, such as Wi-Fi, BT, BLE, Cellular (LTE/5G), or the like.

The second communication interface 1384 may be realized using an antenna for use in wireless communications, such as multi-input multi-output (MIMO) communications, BT, and the like. The antenna may include, but is not limited to directional antennas, omnidirectional antennas, monopoles, patch antennas, loop antennas, microstrip antennas, dipoles, and any other antenna(s) suitable for communication transmission/reception. The antenna generally interacts with an AFE, which may be required to enable correct processing of the received modulated signal and signal conditioning for a transmitted signal. The AFE may be functionally located between the antenna and a digital baseband system in order to convert the analog signal into a digital signal for processing and vice-versa. For exemplary purposes, as illustrated in FIG. 13B, the antenna may be a BLE antenna 1384A that may be connected to a wireless communication interface capable of supporting paired interaction with, for example a BLE control circuit, such as the BLE MCU 1384B, as illustrated in FIG. 13B.

As described above with regards to the first communication interface 1320, the second communication interface 1384 may also be realized using wireless radio (that may include a Wi-Fi/BT/BLE module, and a transceiver which can transmit and receive signals, to and from other wireless devices or access points using the antennas. Non limiting examples of the wireless protocols that may include Wi-Fi (e.g. IEEE 802.11a/b/g/n, WiMax, WirelessHD, WiGig, WiGi), BT/BLE, infrared, LTE, 4G, 5G, 3GPP, and the like, through BLE interface, WiFi interface, near-field communication (NFC) interface, cellular technology interface, and other interface(s).

The output devices 1386 may include the RGB and IR LEDs 1388 that may generate audio and/or visual feedback for the user 99 to provide first-time user experience based on the conversion to the second device state from the first device state of the GR device 1250. The RGB LEDs from the RGB and IR LEDs 1388 may be configured to illuminate in different animated colors to provide a visual feedback to the user 99 when the GR device 1250 converts to a wake state from the ultra-deep sleep state, i.e. the ship mode state. The infrared (IR) LED from the RGB and IR LEDs 1388 may be configured to emit a directional IR beam that is detected by a target device and determine the gesture provided by the user 99.

The second power storage device and LED FPCA 1390 that includes a second rechargeable battery 1390A, stores power or electric charge from the power received from the second boost regulator 1366. The second rechargeable battery 1390A may be of different types, including but not limited to, alkaline, nickel-cadmium (NiCd), nickel-metal hydride (NiHM), and lithium-ion, among others. The second rechargeable battery 1390A may exhibit shapes and dimensions suitable for fitting in the GR device 1250, while charging capacity and cell design of the second rechargeable battery 1390A may depend on load requirements. For example, for charging or powering the GR device 1250, the second rechargeable battery 1390A may deliver a voltage from about 3 volts to about 4.2 volts.

Figure 13C:
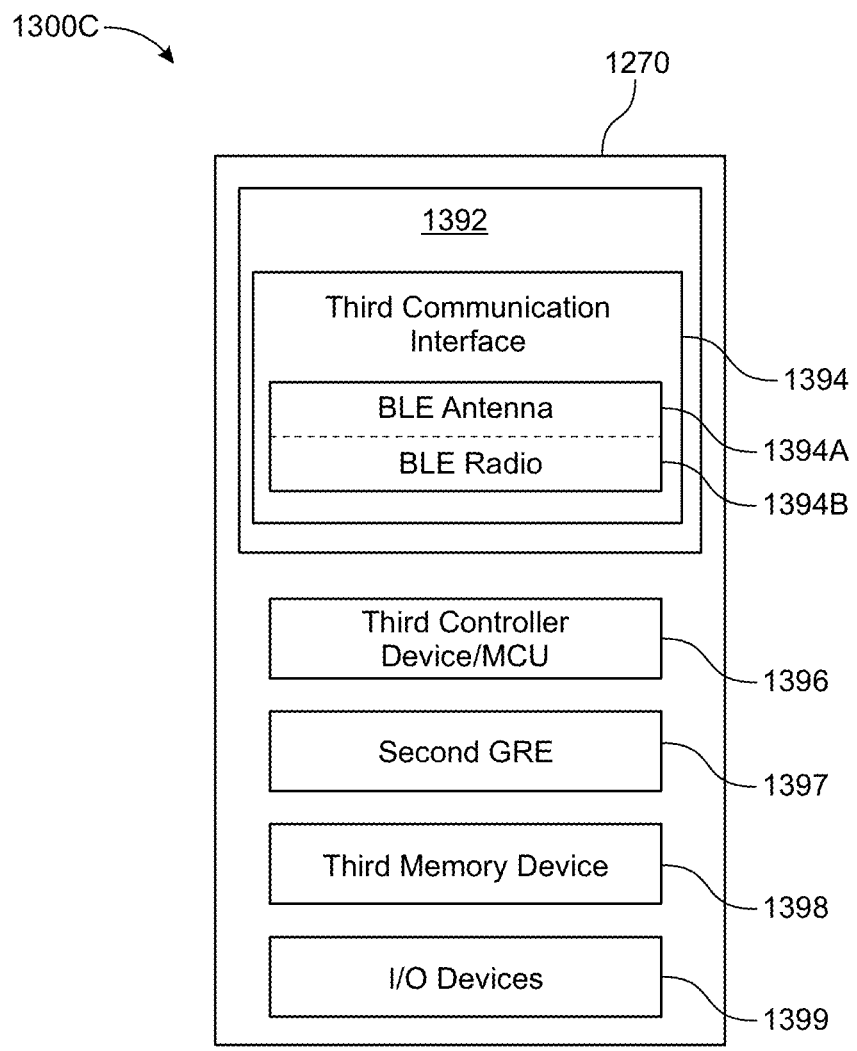
FIG. 13C is a component diagram that illustrates a third schematic view of an external electronic device, in accordance with various embodiments of the disclosure.

FIG. 13C is another component diagram that illustrates a third schematic view 1300C of the external electronic device 1270, in accordance with various embodiments of the disclosure. The third schematic view 1300C of the external electronic device 1270 includes a third communication interface 1394, a third controller device/MCU 1396, a second GRE 1397, a third memory device 1398, and input/output (I/O) devices 1399 mounted on a third PCBA 1392.

The third communication interface 1394 may include components, such as a transceiver, a BLE radio 1394B in communication with a BLE antenna 1394A, for connecting to a wireless network and/or a port (not shown) for accepting a physical connection to a network, such that data may be received via one or more types of networks. The external electronic device 1270 may further comprise the third memory device 1398 that stores data, possibly after being received via the antenna or the port or after being generated at the user interface. The third memory device 1398 may further store computer program code and/or mobile applications, i.e. apps, which may be used to instruct/enable the third controller device/MCU 1396 to perform functions (e.g. read, write, delete, edit or process data). The third controller device/MCU 1396 may receive data from the user interface of the I/O devices 1399, the third memory device 1398, or from the third communication interface 1394 for performing such functions. The second GRE 1397 may comprise suitable logic, circuitry, and interfaces that may be configured to receive input from the GR device 1250, and classify gestures by type and associate the action identifiers and gesture types performed by the user 99 using the GR device 1250, while characterizing a movement pattern of the GR device 1250 as digital data. The I/O devices 1399 may include a display device such as, a Liquid Crystal Display (LCD), e-Ink or touch-screen user interface. The display device may be a bendable, foldable, and/or rollable flexible display. The display device may be curved (for example as a flexible display screen or as a rigid curved glass/plastic display screen).

The external electronic device 1270, in accordance with different embodiments, may be a portable electronic device, a laptop computer, a mobile phone, a Smartphone, a tablet computer, a personal digital assistant, a digital camera, or other such personal electronic device associated with the user 99.

It may be noted that the construction and functionality of the third communication interface 1394 may be similar to the construction and functionality of the first communication interface 1320 (described in FIG. 13A) of the interactive casing 1200 and the second communication interface 1384 of the GR device 1250 (described in FIG. 13B). Similarly, the construction and functionality of the second GRE 1397 may be similar to the construction and functionality of the first GRE 1376 of the GR device 1250 (described in FIG. 13B).

Figure 14A:
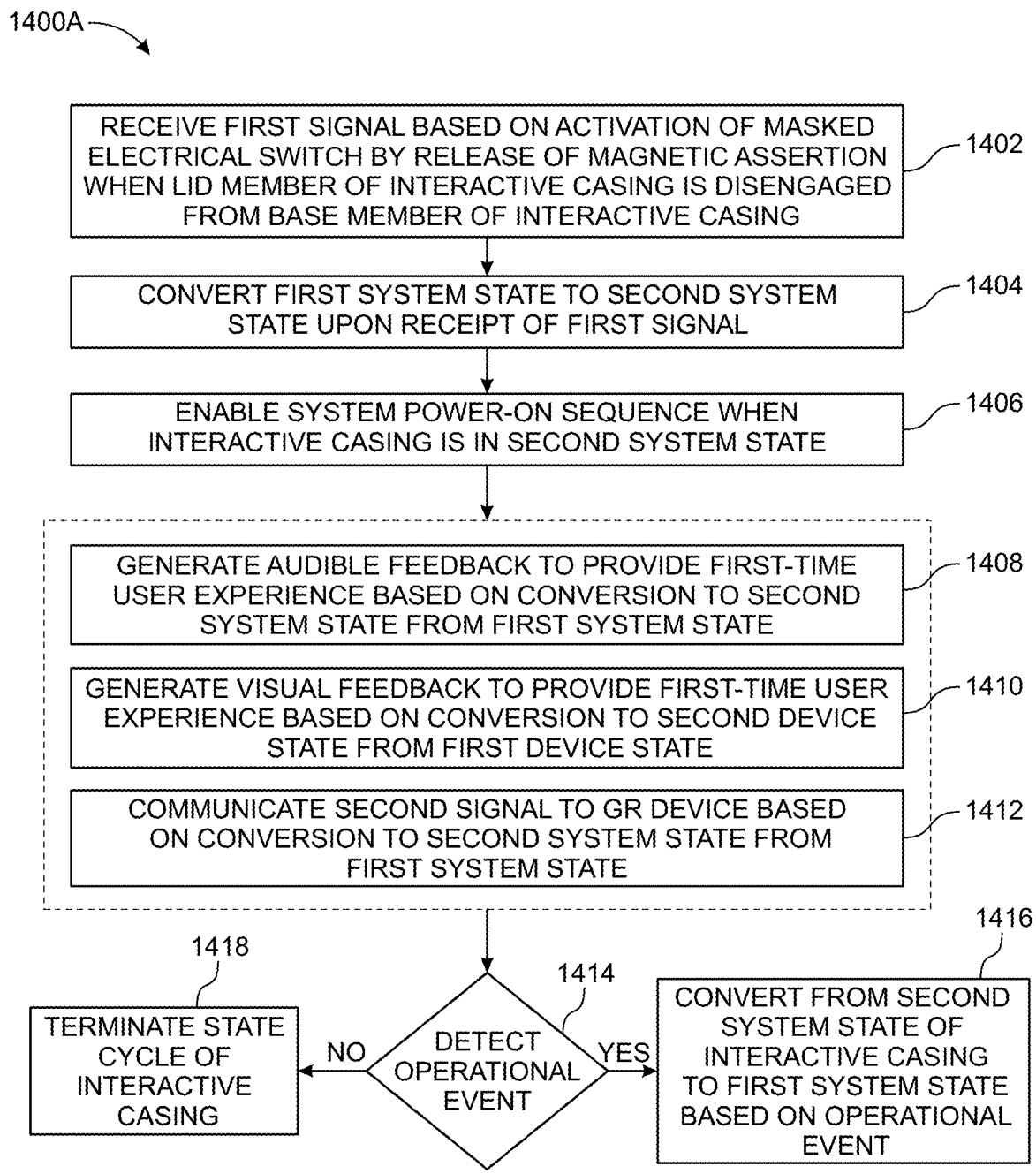
FIG. 14A is a flow chart illustrating a first process for managing states of the interactive casing, in accordance with various embodiments of the disclosure.
Figure 14B:
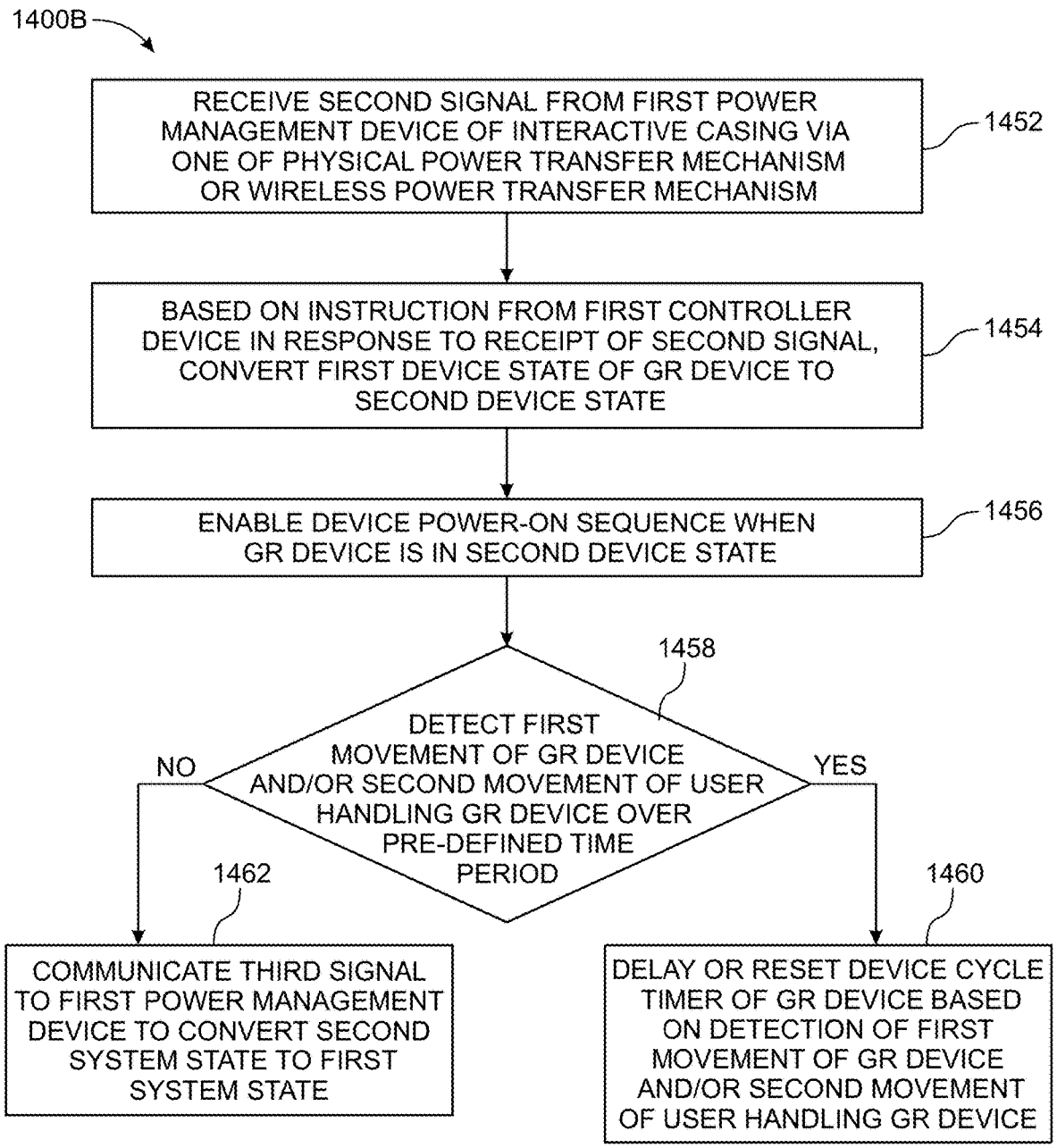
FIG. 14B is a flow chart illustrating a second process for managing states of the GR device, in accordance with various embodiments of the disclosure.

FIGS. 14A and 14B are flow charts 1400A and 1400B collectively illustrate an overall method for managing states of the interactive casing 1200 and a GR device 1250 as a system, in accordance with various embodiments of the disclosure. Specifically, FIG. 14A is a flow chart 1400A illustrating a first process for managing states of the interactive casing 1200 and FIG. 14B is a flow chart 1400B illustrating a second process for managing states of the GR device 1250, in accordance with various embodiments of the disclosure. FIGS. 14A and 14B are described in conjunction with FIGS. 12A to 12C and 13A to 13C.

With reference to FIG. 14A, at 1402, a first signal may be received based on an activation of the masked electrical switch 1212 by release of a magnetic assertion when the lid member 1206 of the interactive casing 1200 is disengaged from the base member 1204 of the interactive casing 1200. In accordance with an embodiment, a first processor, such as the first PMD 1310 of the interactive casing 1200, may be configured to receive the first signal based on the activation of the masked electrical switch 1212, such as the reed switch 1324, by release of the magnetic assertion when the lid member 1206 of the interactive casing 1200 is disengaged from the base member 1204 of the interactive casing 1200. The magnetic assertion may be provided by the magnetic component 1214 in the lid member 1206. In accordance with an embodiment, the first controller device/MCU 1322 may be configured to generate the first signal and communicate the first signal to the first PMD 1310.

Prior to generating the first signal, the interactive casing 1200 may be in a first system state. In accordance with an embodiment, the first system state corresponds to a ship mode state. The power level of the first power storage device 1328 of the interactive casing 1200 is maintained during the first device state. In other words, the power level of a first power storage device 1328 of the interactive casing 1200 is minimally drained <5 µA during the first system state. In the first system state, i.e. the ship mode state, the first ship mode controller 1318A may optionally invert the first set of transistors 1319D to minimize the first current leakage from the first power storage device 1328. In accordance with an embodiment, once the first signal is generated, optionally, the signal inverter 1308 may provide reset signals to the first PMD 1310 based on corresponding ship modes and/or operational characteristics of the first PMD 1310. In an exemplary embodiment, the signal inverter 1308 may communicate the first signal, i.e. the lid detection signal, to the first PMD 1310 and wake-up the first PMD 1310. In another exemplary embodiment, the signal inverter 1308 may communicate the first signal to the first controller device/MCU 1322 and powers on the first controller device/MCU 1322.

At 1404, a first system state may be converted to a second system state of the interactive casing 1200 upon the receipt of the first signal. In accordance with an embodiment, the first processor, such as the first PMD 1310 of the interactive casing 1200, may be configured to convert the first system state to the second system state of the interactive casing 1200 upon the receipt of the first signal. The second system state may correspond to a wake state.

In accordance with an embodiment, the first sleep/wake mode controller 1318B may optionally invert the first set of transistors 1319D to enable current flow from the first power storage device 1328 when the interactive casing 1200 is converted to the second system state. In accordance with an embodiment, the conversion of the first system state to the second system state is automatic and independent of a touch assertion by the user 99 on the GR device 1250.

At 1406, a system power-on sequence may be enabled when the interactive casing 1200 is in the second system state. In accordance with an embodiment, the first processor, such as the first PMD 1310, may be configured to enable the system power-on sequence when the interactive casing 1200 is in the second system state. Consequently, the first controller device/MCU 1322 powers up and activates all the other components, such as the first communication interface 1320 and the output devices 1332.

Once the power-on sequence of the first controller device/MCU 1322 in the interactive casing 1200 is enabled upon the conversion of the system state, following steps 1408, 1410 and 1412 may be performed simultaneously in near real time. For illustrative purposes, the sequence of the method steps is depicted in the flowchart 1400A to be in the order of steps 1408, 1410 and 1412, corresponding to generating the audible feedback, generating the visual feedback, and communicating the second signal, respectively. Notwithstanding, it should not be construed to be limiting, and a different order of the steps may be possible, for example, communicating the second signal followed by the generation of the audible and video feedback, without any deviation from the scope of the disclosure.

At 1408, an audible feedback may be generated to provide first-time user experience based on the conversion to the second system state from the first system state. In accordance with an embodiment, the first processor, such as the first controller device/MCU 1322, may be configured to generate audible feedback to provide first-time user experience based on the conversion to the second system state from the first system state. The generated audible feedback may be rendered by the speaker 1338 of the output devices 1332. The audible feedback may correspond to a sound effect pre-stored in the first memory device 1326. For example, the pre-stored sound effect may be a thematic music, such as a movie-based sound effect, or other animated effects, such as sci-fi sound effects.

At 1410, a visual feedback may be generated to provide the first-time user experience based on the conversion to the second device state from the first device state. In accordance with an embodiment, the first processor, such as the first controller device/MCU 1322, in conjunction with the output devices 1332 may be configured to generate a visual feedback to provide first-time user experience based on the conversion to the second device state from the first device state. For example, the RGB LEDs from the casing RGB and IR LEDs 1334 may be configured to illuminate in different animated colors to generate a visual ambience and thus, provide a visual feedback to the user 99 when the interactive casing 1200 converts to a wake state from the ultra-deep sleep state, i.e. the ship mode state.

At 1412, a second signal may be communicated to the GR device 1250 based on the conversion to the second system state from the first system state. In accordance with an embodiment, the first processor, such as the first controller device/MCU 1322, in conjunction with the first PMD 1310 may be configured to communicate the second signal to the GR device 1250 based on the conversion to the second system state from the first system state. In an embodiment, the first controller device/MCU 1322 in conjunction with the first PMD 1310 may be configured to communicate the second signal to the second PMD 1360 of the GR device 1250. In another embodiment, the first controller device/MCU 1322 in conjunction with the first PMD 1310 may be configured to communicate the second signal to the second controller device/MCU 1370 of the GR device 1250. The second signal may correspond to power signal that may be communicated by the first controller device/MCU 1322 in conjunction with the first PMD 1310 via one of physical power transfer mechanism or wireless power transfer mechanism. In an exemplary embodiment, the power transfer mechanism may be realized by the USB-C plug 1342 in the first charging port 1340. However, the above example should not be construed to be limiting, and other wireless power transfer mechanism, such as inductive charging, may be implemented without any deviation from the scope of the disclosure.

In order to generate the second signal, the first controller device/MCU 1322 may trigger the first PMD 1310 to enable the OTG power rail in the first charging port 1340 such that the interactive casing 1200 enabled as a host for a peripheral device, such as the GR device 1250. The first boost regulator 1316 in the first PMD 1310 may step-up the input voltage (supply) provided by the first power storage device 1328 to output voltage (load) required by, for example the VBUS of the USB, which may provide 5.0 V up to 500 mA of current. Consequently, the first charging port 1340 may be triggered to supply power of 5.0 V on the VBUS rail to the second USB-C receptacle 1382 of the second charging port 1380 of the GR device 1250. In instances that the first charging port 1340 may be a standard host port, the first charging port 1340 may supply up to 500 mA on the VBUS rail. In instances that the first charging port 1340 may be a charging host port, the first charging port 1340 may be operable to supply up to 1500 mA on the VBUS rail for full speed and low speed USB communications and up to 900 mA on the VBUS rail for high-speed USB operations. In instances that the first charging port 1340 may be a dedicated charging port, the first charging port 1340 may be operable to supply up to 1800 mA on the VBUS rail.

At 1414, an operational event may be detected. In accordance with an embodiment, the first processor, such as the first controller device/MCU 1322, may be configured to detect the operational event. The operational event may correspond to one or more of various events. For example, one event may be a first detection of an unestablished first communication channel between the interactive casing 1200 and an external device, such as the external electronic device 1270. Another event may be another unestablished second communication channel between the GR device 1250 and the external device, such as the external electronic device 1270, over a pre-defined time period. Yet another event may be a second detection of a zero first movement of the GR device 1250 and/or a zero second movement of the user 99 handling the GR device 1250 over a pre-defined time period. Yet another event may be based on an assertion of the masked electrical switch 1212 in the interactive casing 1200 via a presence of a magnetic-field induced by the magnetic component 1214 in the lid member 1206 over another pre-defined time period. In accordance with an embodiment, when the operational event is detected, control passes to step 1416. In accordance with another embodiment, when the operational event is not detected, control passes to step 1418.

At 1416, the second system state of the interactive casing 1200 may be converted to the first system state based on the operational event. In accordance with an embodiment, when the operational event is detected, the first PMD 1310 in conjunction with the first controller device/MCU 1322 may be configured to convert the second system state of the interactive casing 1200 back to the first system state. Such an action may ensure that the interactive casing 1200 is not in the second system state due to any false trigger. In accordance with an embodiment, when the system state of the interactive casing 1200 is converted back to the first system state, the first PMD 1310 in conjunction with the first controller device/MCU 1322 may be configured to communicate a third signal to the second PMD 1360 and/or the second controller device/MCU 1370. The third signal may correspond to an interruption signal to change the device state of the GR device 1250 back to sleep mode state or ship mode state, if the GR device 1250 is in wake mode or power-on mode.

In accordance with an embodiment, the first PMD 1310 in conjunction with the first controller device/MCU 1322 may be configured to convert the second system state to the first system state based on the detection of the unestablished first communication channel between the interactive casing 1200 and the external device, such as the external electronic device 1270, and/or another unestablished second communication channel between the GR device 1250 and the external device over the pre-defined time period.

In accordance with another embodiment, the first PMD 1310 in conjunction with the first controller device/MCU 1322 may be configured to convert the second system state to the first system state based on the detection of zero first movement of the GR device 1250 and/or zero second movement of the user 99 handling the GR device 1250 over the pre-defined time period.

In accordance with an embodiment, the first PMD 1310 in conjunction with the first controller device/MCU 1322 may be configured to convert the second system state to the first system state based on the assertion of the masked electrical switch 1212 in the interactive casing 1200 via the presence of a magnetic field induced by the magnetic component 1214 in the lid member 1206 over the pre-defined time period.

For such back conversion, the first PMD 1310 may disable the low-dropout regulator 1319C and the bus engine. Accordingly, the first ship mode controller 1318A may turn off all the electronic components in the interactive casing 1200 to achieve the ultra-deep sleep state by turning off the first set of transistors 1319D. As a result, the first PMD 1310 converts the second system state to the first system state of the interactive casing 1200.

At 1418, the state cycle of the interactive casing 1200 may be terminated. In accordance with an embodiment, when the operational event is not detected, the first PMD 1310 may be configured to terminate the state cycle of the interactive casing 1200. As a result, the first PMD 1310 exits the state cycle of back conversion to the first system state of the interactive casing 1200.

In accordance with an embodiment, the conversion of the first system state to the second system state and a back conversion from the second system state to the first system state corresponds to the state cycle of the interactive casing 1200. The termination of the state cycle prevents the back conversion from the second system state to the first system state.

In accordance with an embodiment, the first PMD 1310 may be further configured to terminate the state cycle of the interactive casing 1200 based on a detection of an established first communication channel between the interactive casing 1200 and the external device, such as the external electronic device 1270, when the interactive casing 1200 is in the second system state.

In accordance with an embodiment, the first PMD 1310 may be further configured to terminate the state cycle of the interactive casing 1200 based on a detection of another establishment of a second communication channel between the GR device 1250 and the external device when the GR device 1250 is in the second device state.

FIG. 14B is another flow chart 1400B illustrating a second process for managing states of the GR device 1250, in accordance with various embodiments of the disclosure. FIG. 14A is described in conjunction with FIGS. 12A to 12C and 13A to 13C.

At 1452, the second signal may be received from the first PMD 1310 of the interactive casing 1200 via one of the physical power transfer mechanism or the wireless power transfer mechanism. In accordance with an embodiment, the second processor, such as the second PMD 1360, may be configured to receive the second signal from the first PMD 1310 of the interactive casing 1200 via one of physical power transfer mechanism or wireless power transfer mechanism. The second signal may correspond to the power signal received from the first PMD 1310 based on which the first device state of the GR device 1250 is converted to the second device state.

In accordance with an embodiment, prior to receiving the second signal, the power level of the second power storage device and LED FPCA 1390 of the GR device 1250 may be maintained during the first device state. The first device state may correspond to a ship mode state when the GR device 1250 is in the ultra-deep sleep mode and the power levels of the second power storage device and LED FPCA 1390 of the GR device 1250 is minimally drained <5 µA during the first device state.

In accordance with an embodiment, the second PMD 1360 may be connected to and controlled by the power line signal of the first PMD 1310 to minimize the second current leakage from the second power storage device and LED FPCA 1390 when the GR device 1250 is in the first device state.

In accordance with an embodiment, when the GR device 1250 is in the first device state, the second PMD 1360 may disable the other low-dropout regulator 1369C and the bus engine. The second ship mode controller 1368A thereby turns off all the electronic components in the GR device 1250 to achieve the ultra-deep sleep state by turning off the second set of transistors 1369D resulting in minimized second current leakage from the second power storage device and LED FPCA 1390.

At 1454, based on an instruction from the first controller device/MCU 1322 in response to the receipt of the second signal, the first device state of the GR device 1250 may be converted to a second device state. In accordance with an embodiment, the second processor, such as the second PMD 1360 or the second controller device/MCU 1370, may be configured to convert to the second device state from the first device state of the GR device 1250 based on the instruction from the first controller device/MCU 1322 in response to the receipt of the second signal. In such an embodiment, the second device state may correspond to the wake state or the full power-on state. The second signal may be received based on the conversion of the interactive casing 1200 to the second system state from the first system state.

In accordance with an embodiment, in the second device state, the second PMD 1360 may enable the other low-dropout regulator 1369C and the bus engine. The second sleep/wake mode controller 1368B may enable the first time device boot/wake-up sequence by turning on the second set of transistors 1369D.

At 1456, a device power-on sequence may be enabled when the GR device 1250 is in the second device state. In accordance with an embodiment, the second processor, such as the second controller device/MCU 1370, may be configured to enable the device power-on sequence when the GR device 1250 is in the second device state. Once the device power-on sequence is enabled, the GR device 1250 becomes fully functional and ready to be used by the user 99. In such a state, the second IMU 1372 may be enabled to detect any movement of the GR device 1250 or the movement of the user 99 handling the GR device 1250. When the GR device 1250 is moved in space to perform a gesture, data from the accelerometer, the gyroscope and/or the magnetometer of second IMU 1372 is processed by the second IMU 1372 to detect the pattern of movements, identify the gesture and associate it with an action to be performed by a connected device.

The output devices 1386 that include the RGB and IR LEDs 1388 and the vibrator motor 1378 may be activated by the second controller device/MCU 1370 while the GR device 1250 is in the second device state. For example, the RGB LEDs from the RGB and IR LEDs 1388 may illuminate in multi-colours and the vibrator motor 1378 may generate haptic feedback when the user 99 activates the GR device 1250 and subsequently provides gestures to perform a specific action, such as interacting with smart devices at home, franchise locations, events, or bespoke enchanted items, thereby providing a spellcasting and magical experience to the user 99. In another example, the second controller device/MCU 1370 may activate the output devices when the GR device 1250 is asserted, as detected by the capacitive sensors 1356, thus inferring the intent of the user 99 to cast a spell, i.e., perform a gesture in the connected environment 200 (as described in FIG. 2) based on a pre-defined gesture and/or voice commands.

At 1458, a first movement of GR device 1250 and/or a second movement of the user 99 handling the GR device 1250 may be detected over a pre-defined time period. In accordance with an embodiment, the second processor, such as the second IMU 1372, in conjunction with the second controller device/MCU 1370 may be configured to detect the first movement of the GR device 1250 and/or a second movement of the user 99 handling the GR device 1250 over the pre-defined time period.

In an embodiment, when the first movement of the GR device 1250 and/or the second movement of the user 99 handling the GR device 1250 is detected to be non-zero over the pre-defined time period, the control passes to step 1460. In another embodiment, when the first movement of the GR device 1250 and/or the second movement of the user 99 handling the GR device 1250 is detected to be zero over the pre-defined time period, the control passes to step 1462.

At 1460, the device cycle timer of GR device 1250 may be delayed or reset based on the detection of the first movement of the GR device 1250 and/or the second movement of the user handling the GR device 1250. In accordance with an embodiment, the second processor, such as the second controller device/MCU 1370, may be configured to delay or reset the device cycle timer of GR device 1250 based on the detection of the first movement of the GR device 1250 and/or the second movement of the user handling the GR device 1250. The device cycle of the GR device 1250 may correspond to a conversion from the first device state to the second device state and a back conversion from the second device state to the first device state. Thus, a delay in the device cycle of the GR device 1250 may correspond to an extended duration for the conversion and the back conversion of the states. In other words, as long as the second IMU 1372 continues detecting the first movement of the GR device 1250 and/or the second movement of the user handling the GR device 1250, the device cycle timer of GR device 1250 is delayed or reset to prevent the back conversion to the first device state, i.e. the ship mode state, by the second controller device/MCU 1370.

At 1462, a third signal may be communicated to the first PMD 1310 to convert from the second system state to the first system state. In accordance with an embodiment, the second processor, such as the second PMD 1360, may be configured to communicate the third signal to the first PMD 1310 to convert from the second system state to the first system state.

In accordance with an embodiment, based on the third signal (that acts as an interruption signal) received from the second PMD 1360, the first PMD 1310 may disable the low-dropout regulator 1319C and the bus engine. The first ship mode controller 1318A may turn off all the electronic components in the interactive casing 1200 to achieve the ultra-deep sleep state by turning off the first set of transistors 1319D. As a result, the first PMD 1310 may convert from the second system state to the first system state, thereby enabling the ship mode state for the interactive casing 1200.

Figure 15:
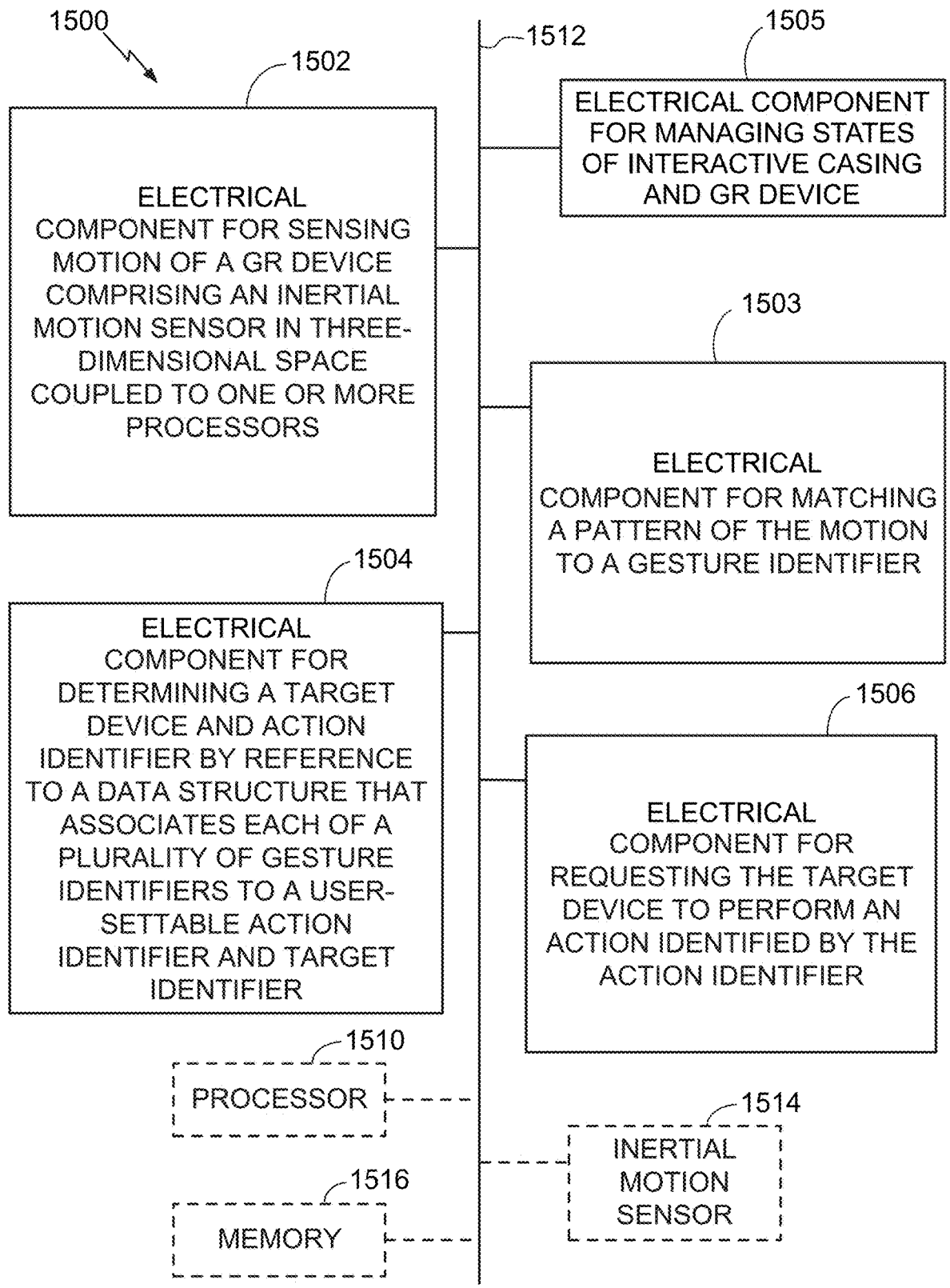
FIG. 15 is a conceptual block diagram illustrating components of an apparatus or system for providing a gesture-centric user interface for controlling one or more connected devices.

FIG. 15 shows components of an apparatus or system 1500 for providing a gesture-centric user interface for multiple target devices and sensing multi-factor touch assertion as described herein, according to methods 1100 and 1400A and 1400B. As depicted, the apparatus or system 1500 may include functional blocks that can represent functions implemented by a processor, software, or combination thereof (e.g., firmware).

The apparatus or system 1500 may comprise an electrical component 1502 for sensing motion of a GR device comprising an inertial motion sensor in three-dimensional space coupled to one or more processors. The component 1502 may be, or may include, a means for said sensing. Said means may include the processor 1510 coupled to the memory 1516, and to the inertial motion sensor 14, the processor executing an algorithm based on program instructions stored in the memory. Such algorithm may include a sequence of more detailed operations, for example, method 700 as described in connection with FIG. 7.

The apparatus or system 1500 may further comprise an electrical component 1503 for matching a pattern of the motion to a gesture identifier, e.g., recognizing the gesture. The component 1503 may be, or may include, a means for said matching or recognizing. Said means may include the processor 1510 coupled to the memory 1516, the processor executing an algorithm based on program instructions stored in the memory. Such algorithm may include a sequence of more detailed operations, for example, method 804 as described in connection with FIG. 8B.

The apparatus or system 1500 may further comprise an electrical component 1504 for determining a target device and action identifier by reference to a data structure that associates each of a plurality of gesture identifiers to a user-settable action identifier and target identifier. The component 1504 may be, or may include, a means for said matching. Said means may include the processor 1510 coupled to the memory 1516 containing a library data structure, the processor executing an algorithm based on program instructions stored in the memory. Such algorithm may include a sequence of more detailed operations, for example, the method 800 described in connection with FIG. 8A.

The apparatus or system 1500 may further comprise an electrical component 1505 for sensing multi-factor touch assertion. The component 1505 may be, or may include, a means for said sensing. Said means may include the processor 1510 coupled to the memory 1516 containing a library data structure, the processor executing an algorithm based on program instructions stored in the memory. Such algorithm may include a sequence of more detailed operations, for example, the methods 1400A and 1400B described in connection with FIGS. 14A and 14B.

The apparatus or system 1500 may further comprise an electrical component 1506 for requesting the target device to perform an action identified by the action identifier. The component 1506 may be, or may include, a means for said requesting. Said means may include the processor 1510 coupled to the memory 1516, and to a network interface device, the processor executing an algorithm based on program instructions stored in the memory. Such algorithm may include a sequence of more detailed operations, for example, the method 900 described in connection with FIG. 9.

The apparatus 1500 may optionally include a processor module 1510 having at least one processor, in the case of the apparatus 1500 configured as a data processor. The processor 1510, in such case, may be in operative communication with the modules 1502-1506 via a bus 1512 or other communication coupling, for example, a network. The processor 1510 may initiate and schedule the processes or functions performed by electrical components 1502-1506. The electrical components 1502-1506 may also be referred to as circuits or circuitry.

In related aspects, the apparatus 1500 may include a network interface module (not shown in FIG. 15, shown in FIG. 1) operable for communicating with a targeted clients and network resources over a computer network. In further related aspects, the apparatus 1500 may optionally include a module for storing information, such as, for example, a memory device/module 1516. The computer readable medium or the memory module 1516 may be operatively coupled to the other components of the apparatus 1500 via the bus 1512 or the like. The memory module 1516 may be adapted to store computer readable instructions and data for effecting the processes and behavior of the modules 1502-1506, and subcomponents thereof, or the processor 1510, or the any method or process described herein. The memory module 1516 may retain instructions for executing functions associated with the modules 1502-1506. While shown as being external to the memory 1516, it is to be understood that the modules 1502-1506 can exist within the memory 1516.

The proposed exemplary system and method of managing states of the interactive casing 1200 and the GR device 1250 provides various advantages. For example, the aesthetic look-and-feel of the system is greatly enhanced due to incorporation of buttonless finishing and seamless surfaces for the interactive casing 1200, without any protrusion. Further, the proposed system provides first-time user experience every time the GR device 1250 is unboxed, thereby improving the user appeal and providing a dramatically magical experience to the user. Furthermore, the power levels of the storage devices of the interactive casing 1200 and the GR device 1250 are minimally drained <5 µA during the ship mode or the ultra-deep sleep mode. Such a minimal drainage drastically improves the shelf-life of the proposed system as the depletion of the battery is prevented. Thus, while the proposed system is stored in warehouse for extended years resting in the ship mode state, it will still provide the first-time user experience whenever the user unboxes the magical GR device 1250 from the interactive casing 1200.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

What is claimed is:

1. A system, comprising:
a memory for storing instructions; and
a first processor for executing the instructions to perform a method, the method comprising:
  receiving a first signal based on an activation of a masked electrical switch by release of a magnetic assertion when a lid member of an interactive casing is disengaged from a base member of the interactive casing;
  converting a first system state of the interactive casing to a second system state upon receipt of the first signal;
  generating audio-visual feedback to provide a first-time user experience based on the conversion to the second system state from the first system state; and
  communicating a second signal to a gesture-recognition (GR) device based on the conversion to the second system state from the first system state,
    wherein, based on the received second signal, a first device state of the GR device is converted to a second device state, and
    wherein power levels of a first power storage device of the interactive casing and a second power storage device of the GR device are maintained during the first system state and the first device state, respectively.

2. The system according to claim 1, wherein the GR device is a wireless interactive wand or a smart wand configured to communicate wirelessly via a radio frequency (RF) or an infrared (IR) communication mode with the interactive casing and/or an external electronic device by utilizing power generated by the second power storage device.

3. The system according to claim 1, wherein the first processor is controlled by a state of a magnetic assertion signal connected to an optional inverting of a first set of transistors to minimize a first current leakage from the first power storage device when the interactive casing is in the first system state,
    wherein a second processor is connected to and controlled by a power line signal of the first processor to minimize a second current leakage from the second power storage device when the GR device is in the first device state, and
    wherein the first system state and the first device state correspond to a ship mode state.

4. The system according to claim 1, wherein the method further comprising enabling, by the first processor, a system power-on sequence when the interactive casing is in the second system state,
    wherein a second processor is further configured to enable a device power-on sequence when the GR device is in the second device state, and
    wherein the second system state and the second device state correspond to a wake-up state.

5. The system according to claim 1, wherein a top surface of the base member of the interactive casing comprises a longitudinal cavity,
    wherein boundary line of the longitudinal cavity is based on contours of the GR device, and
    wherein the longitudinal cavity is adapted to removably secure the GR device.

6. The system according to claim 5, wherein the top surface of the base member of the interactive casing further comprises a flat portion under which the masked electrical switch and additional electrical components are masked.

7. The system according to claim 5, wherein a bottom surface of the lid member, that engages with the top surface of the base member of the interactive casing, comprises a magnetic component, and
    wherein a detection of a magnetic-field induced by the magnetic component asserts or de-asserts the masked electrical switch when the lid member is engaged or disengaged from the base member.

8. The system according to claim 1, wherein the conversion of the first system state to the second system state and a back conversion from the second system state to the first system state corresponds to a state cycle of the interactive casing, and
    wherein the conversion of the first device state to the second device state and a back conversion from the second device state to the first device state corresponds to a device cycle of the GR device.

9. The system according to claim 8, wherein the method further comprising terminating, by the first processor, the state cycle of the interactive casing based on a detection of an established first communication channel between the interactive casing and an external device when the interactive casing is in the second system state, and/or another establishment of a second communication channel between the GR device and the external device when the GR device is in the second device state, and
    wherein the termination of the state cycle prevents the back conversion from the second system state to the first system state.

10. The system according to claim 8, wherein a device cycle timer of the GR device is delayed or reset by a second processor based on a detection of a first movement of the GR device and/or a second movement of a user handling the GR device.

11. The system according to claim 1, wherein the method further comprising converting, by the first processor, the second system state to the first system state based on a detection of an unestablished first communication channel between the interactive casing and an external device and/or another unestablished second communication channel between the GR device and the external device over a pre-defined time period.

12. The system according to claim 1, wherein the method further comprising converting, by the first processor, the second system state to the first system state based on a detection of a zero first movement of the GR device and/or a zero second movement of a user handling the GR device over a pre-defined time period.

13. The system according to claim 1, wherein the method further comprising converting, by the first processor, the second system state to the first system state based on an assertion of the masked electrical switch in the interactive casing via a presence of a magnetic-field induced by a magnetic component in the lid member over a pre-defined time period.

14. The system according to claim 1, wherein the conversion of the first system state and the first device state to the second system state and the second device state, respectively, is independent of a touch assertion by a user on the GR device.

15. The system according to claim 1, wherein the first power storage device of the interactive casing and the second power storage device of the GR device correspond to non-removable rechargeable batteries.

16. The system according to claim 1, wherein the method further comprising communicating, by the first processor, the second signal to a second processor of the GR device, via the first processor of the interactive casing,
    wherein, based on the second signal, the first device state of the GR device is converted to the second device state by the second processor.

17. The system according to claim 1, wherein the method further comprising communicating, by the first processor, the second signal to a second processor of the GR device,
    wherein, based on an instruction from the first processor in response to the receipt of the second signal, the first device state of the GR device is converted to the second device state by a second processor during a wake state or a full power-on state.

18. The system according to claim 1, wherein the method further comprising transmitting, by the first processor, a power signal to a second processor of the GR device via one of a physical power transfer mechanism or a wireless power transfer mechanism.

19. A method, comprising:
    receiving, by a first processor of an interactive casing, a first signal based on an activation of a masked electrical switch by release of a magnetic assertion when a lid member of the interactive casing is disengaged from a base member of the interactive casing;
    converting, by the first processor, from a first system state to a second system state of the interactive casing upon the receipt of the first signal,
        wherein power levels of a first power storage device of the interactive casing and a second power storage device of a gesture recognition (GR) device are minimally drained during the first system state and a first device state, respectively;
    generating, by the first processor, audible feedback to provide first-time user experience based on the conversion to the second system state from the first system state;

communicating, by the first processor, a second signal to the GR device based on the conversion to the second system state from the first system state,
  wherein, based on the received second signal, the first device state of the GR device is converted to a second device state;
generating, by the first processor, visual feedback to provide the first-time user experience based on the conversion to the second device state from the first device state; and
converting, by the first processor, from the second system state of the interactive casing to the first system state based on an operational event.

20. The method according to claim 19, wherein the operational event corresponds to one of: a first detection of an unestablished first communication channel between the interactive casing and an external device and another unestablished second communication channel between the GR device and the external device over a pre-defined time period, a second detection of a zero first movement of the GR device and/or a zero second movement of a user handling the GR device over a pre-defined time period, or based on an assertion of the masked electrical switch in the interactive casing via a presence of a magnetic-field induced by a magnetic component in the lid member over another pre-defined time period.

\* \* \* \* \*